(12) United States Patent
Yoshida

(10) Patent No.: US 8,873,722 B2
(45) Date of Patent: Oct. 28, 2014

(54) CRADLE FOR MOBILE TELEPHONE, VIDEOPHONE SYSTEM, KARAOKE SYSTEM, CAR NAVIGATION SYSTEM, AND EMERGENCY INFORMATION NOTIFICATION SYSTEM

(76) Inventor: Kenji Yoshida, Tokyo (JP)

( * ) Notice: Subject to any disclaimer, the term of this patent is extended or adjusted under 35 U.S.C. 154(b) by 1002 days.

(21) Appl. No.: 12/936,250

(22) PCT Filed: Apr. 3, 2009

(86) PCT No.: PCT/JP2009/001566
§ 371 (c)(1), (2), (4) Date: May 1, 2012

(87) PCT Pub. No.: WO2009/122756
PCT Pub. Date: Oct. 8, 2009

(65) Prior Publication Data
US 2012/0206555 A1 Aug. 16, 2012

(30) Foreign Application Priority Data

Apr. 4, 2008 (JP) .................................. 2008-097875
Nov. 25, 2008 (JP) .................................. 2008-300118

(51) Int. Cl.
*H04M 11/00* (2006.01)

(52) U.S. Cl.
USPC ..................... 379/100.02; 455/556.1; 455/344

(58) Field of Classification Search
USPC ............................ 379/100.02; 455/556.1, 344
See application file for complete search history.

(56) References Cited

U.S. PATENT DOCUMENTS

| 6,512,919 B2* | 1/2003 | Ogasawara ................ 455/422.1 |
| 2002/0030104 A1 | 3/2002 | Matsui et al. |
| 2009/0091530 A1 | 4/2009 | Yoshida |
| 2009/0094034 A1 | 4/2009 | Yoshida |

FOREIGN PATENT DOCUMENTS

| JP | 2000-124851 A | 4/2000 |
| JP | 2002-187382 A | 7/2002 |
| JP | 2004-030257 A | 1/2004 |
| JP | 2005-277632 A | 10/2005 |
| JP | 2006-033392 A | 2/2006 |
| JP | 2006-140554 A | 6/2006 |
| JP | 2006-180012 A | 7/2006 |
| JP | 2008-072420 A | 3/2008 |
| WO | 2007-032747 A2 | 3/2007 |

OTHER PUBLICATIONS

KDDI, The mobile phone which carried out 1-GB memory loading with the 3.0-inch wide VGA liquid crystal, http://news.mynavi.jp/news/2007/01/16/004.html.

* cited by examiner

*Primary Examiner* — Olisa Anwah
(74) *Attorney, Agent, or Firm* — Konomi Takeshita

(57) ABSTRACT

Provided is an integrated system having a medium printed with a dot pattern, a scanner remote controller that reads the dot pattern, a cradle, a mobile telephone, and audio-visual equipment. The cradle for the mobile phone of the invention is to be used with a scanner remote controller that reads a printed dot pattern, in which information is recorded, and transmits the information. The mobile phone cradle comprises: being capable of having a mobile phone placed thereon and holding the mobile phone and communicating with the placed mobile phone; receiving data from the scanner remote controller to cause the scanner remote controller to function as input means for the mobile phone; and communicating with audio-visual equipment and controlling the audio-visual equipment to cause the audio-visual equipment to function as output means for the mobile phone.

27 Claims, 29 Drawing Sheets

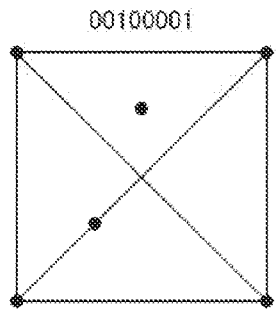
FIG.8A
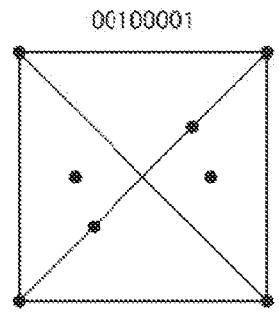
FIG.8B
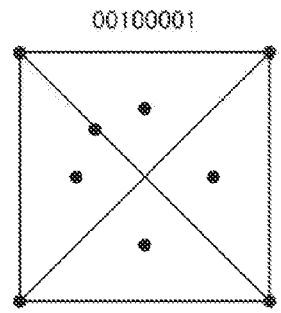
FIG.8C
| $I_3$ | $I_4$ | $I_5$ |
|---|---|---|
| $I_2$ | $I_1$ | $I_6$ |
2 × 3
FIG.9A
| $I_3$ | $I_4$ | $I_5$ |
|---|---|---|
| $I_2$ | $I_1$ | $I_6$ |
| $I_9$ | $I_8$ | $I_7$ |
3 × 3
FIG.9B
| $I_5$ | $I_6$ | $I_7$ |
|---|---|---|
| $I_4$ | $I_1$ | $I_8$ |
| $I_3$ | $I_2$ | $I_9$ |
| $I_{12}$ | $I_{11}$ | $I_{10}$ |
3 × 4
FIG.9C
| $I_{36}$ | $I_{17}$ | $I_{18}$ | $I_{19}$ | $I_{20}$ | $I_{21}$ |
|---|---|---|---|---|---|
| $I_{35}$ | $I_{16}$ | $I_5$ | $I_6$ | $I_7$ | $I_{22}$ |
| $I_{34}$ | $I_{15}$ | $I_4$ | $I_1$ | $I_8$ | $I_{23}$ |
| $I_{33}$ | $I_{14}$ | $I_3$ | $I_2$ | $I_9$ | $I_{24}$ |
| $I_{32}$ | $I_{13}$ | $I_{12}$ | $I_{11}$ | $I_{10}$ | $I_{25}$ |
| $I_{31}$ | $I_{30}$ | $I_{29}$ | $I_{28}$ | $I_{27}$ | $I_{26}$ |
6 × 6
FIG.9D

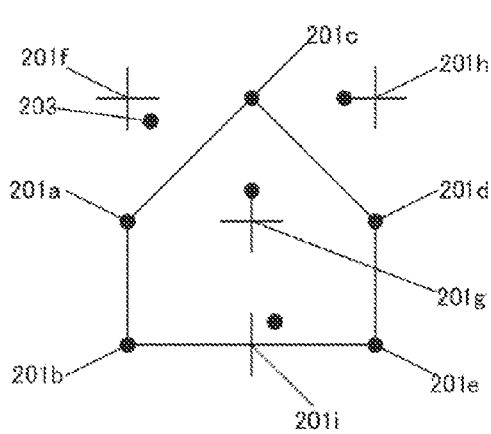
FIG.10A
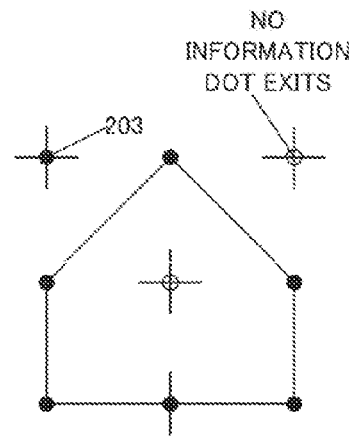
FIG.10B
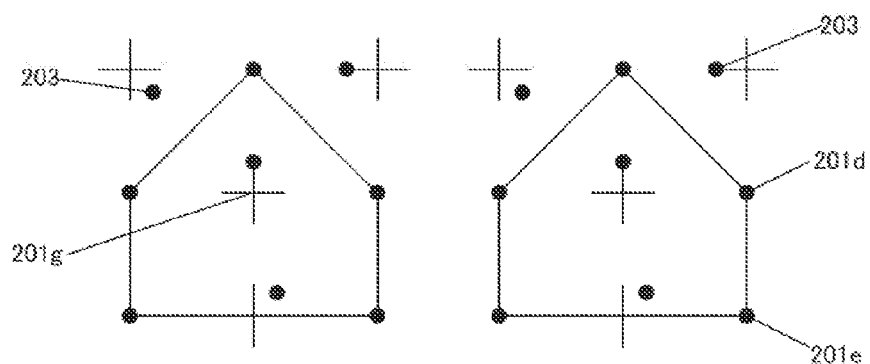
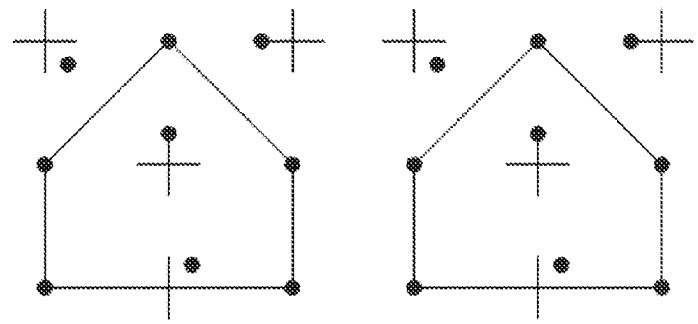
FIG.10C

| $C_{30}$ | $C_{29}$ | $C_{28}$ | $C_{27}$ | $C_{26}$ | $C_{25}$ | $C_{24}$ | $C_{23}$ | $C_{22}$ | $C_{21}$ | $C_{20}$ | $C_{19}$ | $C_{18}$ | $C_{17}$ | $C_{16}$ | $C_{15}$ | $C_{14}$ | $C_{13}$ | $C_{12}$ | $C_{11}$ | $C_{10}$ | $C_9$ | $C_8$ | $C_7$ | $C_6$ | $C_5$ | $C_4$ | $C_3$ | $C_2$ | $C_1$ | $C_0$ |
|---|---|---|---|---|---|---|---|---|---|---|---|---|---|---|---|---|---|---|---|---|---|---|---|---|---|---|---|---|---|---|
| PAGE CODE | | | | | | | Y COORDINATE | | | | | | | | | | | | | | | | X COORDINATE | | | | | | | |

FIG.11A

| $C_{31}$ | $C_{30}$ | $C_{29}$ | $C_{28}$ | $C_{27}$ | $C_{26}$ | $C_{25}$ | $C_{24}$ | $C_{23}$ | $C_{22}$ | $C_{21}$ | $C_{20}$ | $C_{19}$ | $C_{18}$ | $C_{17}$ | $C_{16}$ | $C_{15}$ | $C_{14}$ | $C_{13}$ | $C_{12}$ | $C_{11}$ | $C_{10}$ | $C_9$ | $C_8$ | $C_7$ | $C_6$ | $C_5$ | $C_4$ | $C_3$ | $C_2$ | $C_1$ | $C_0$ |
|---|---|---|---|---|---|---|---|---|---|---|---|---|---|---|---|---|---|---|---|---|---|---|---|---|---|---|---|---|---|---|---|
| PAGE CODE | | | | | | | ACTION CODE | | | | | | | | Y COORDINATE | | | | | | | | X COORDINATE | | | | | | | | |

| $C_{25-24}$ | $C_{27-26}$ | $C_{29-28}$ | $C_{31-30}$ |
|---|---|---|---|
| $C_{17-16}$ | $C_{19-18}$ | $C_{21-20}$ | $C_{23-22}$ |
| $C_{9-8}$ | $C_{11-10}$ | $C_{13-12}$ | $C_{15-14}$ |
| $C_{1-0}$ | $C_{3-2}$ | $C_{5-4}$ | $C_{7-6}$ |

X COORDINATE

Y COORDINATE

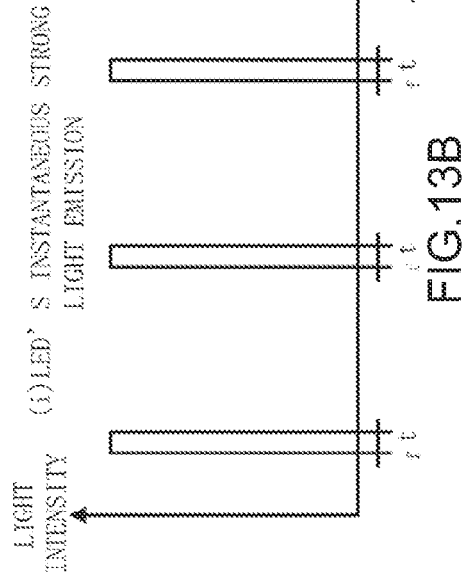
FIG.13A
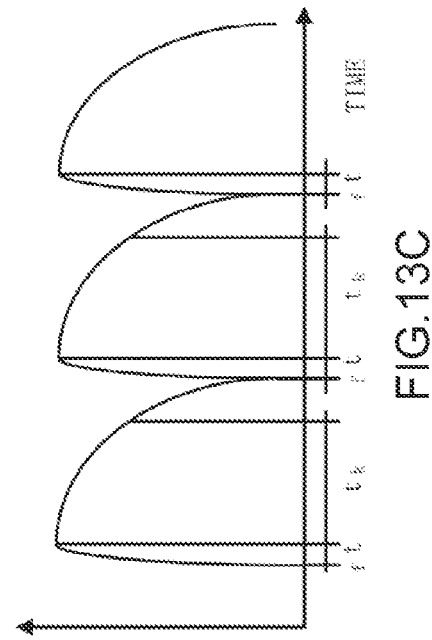
FIG.13B
FIG.13C

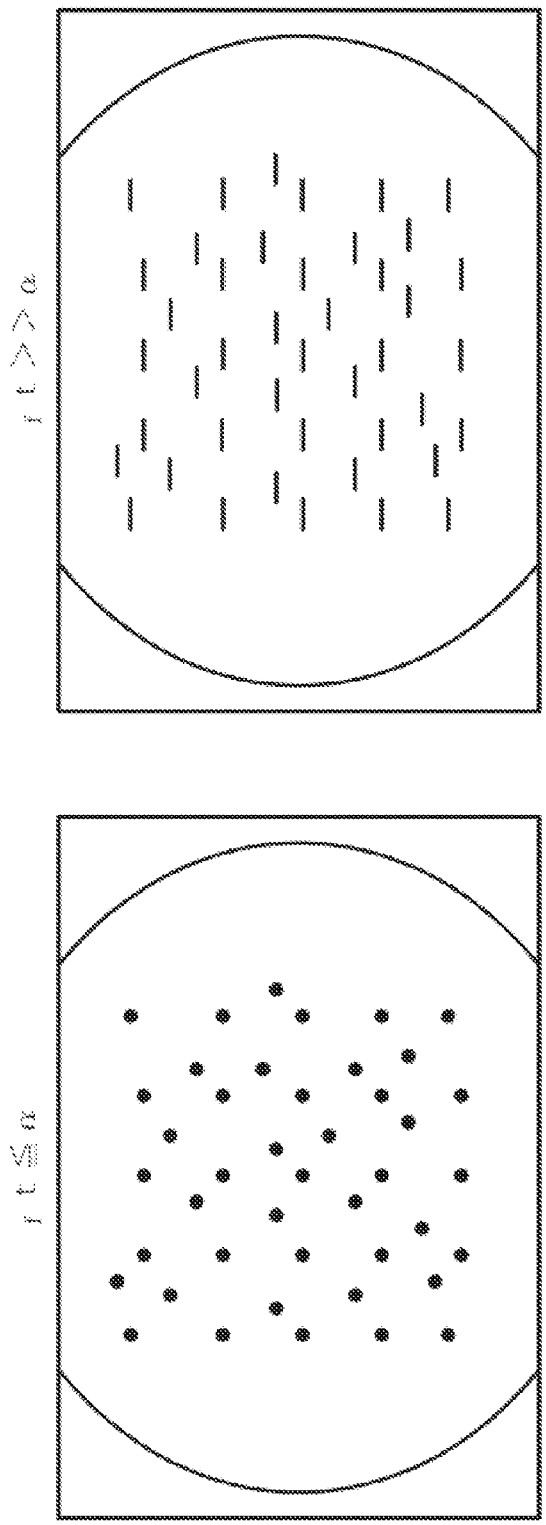

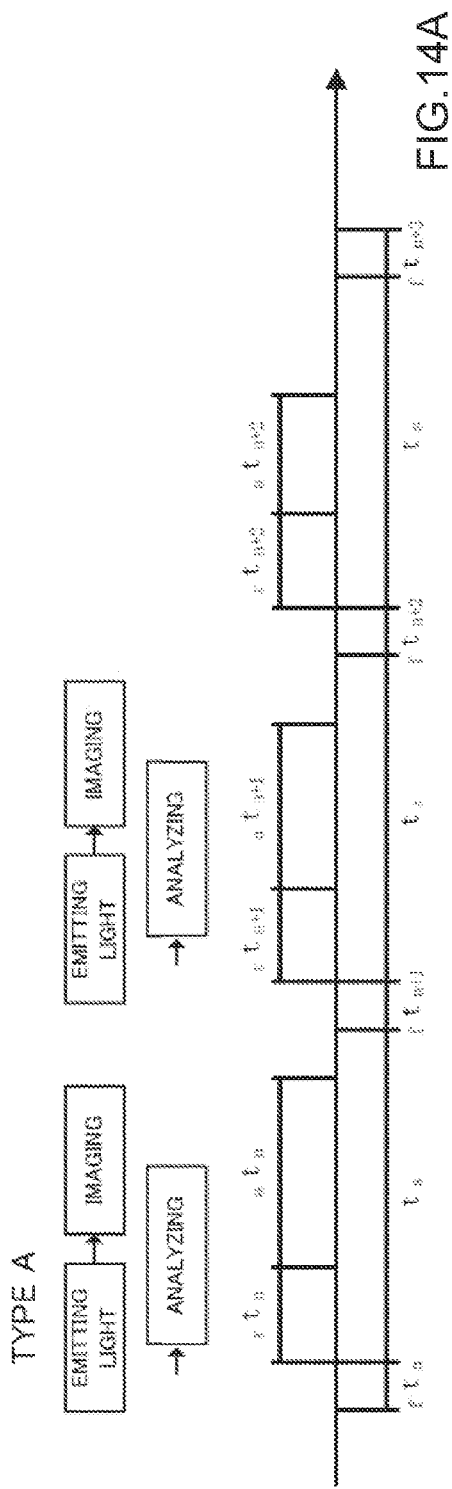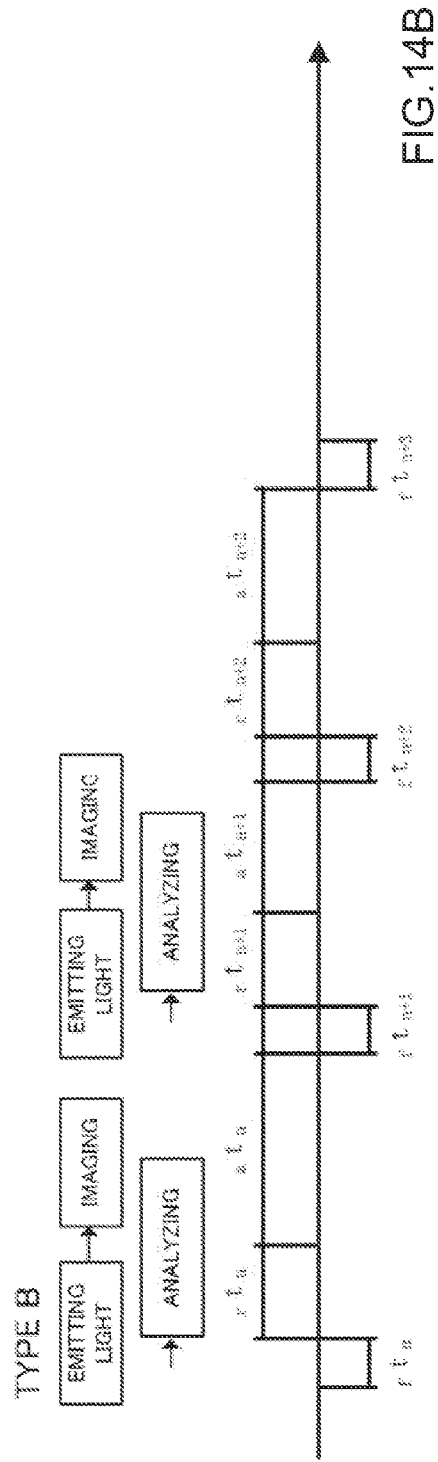

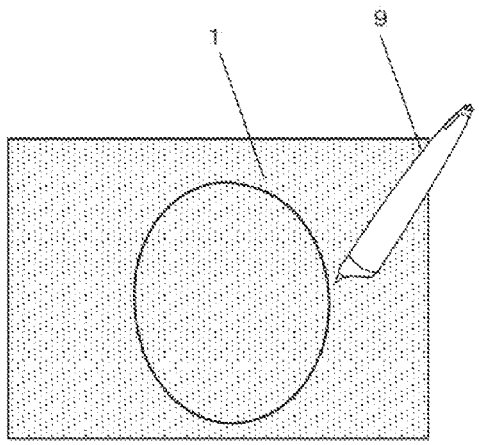
FIG.15A
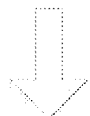
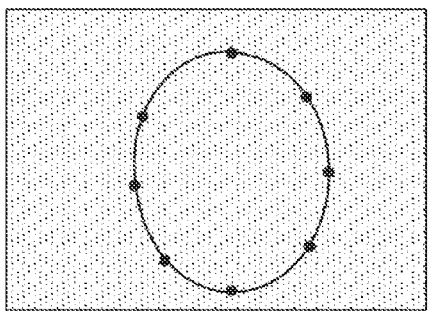
FIG.15B
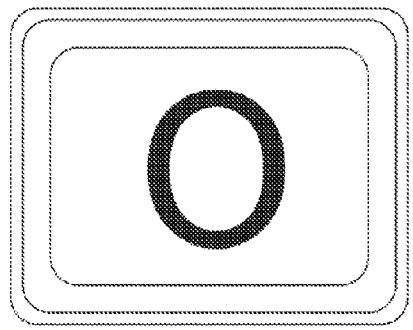
FIG.15C
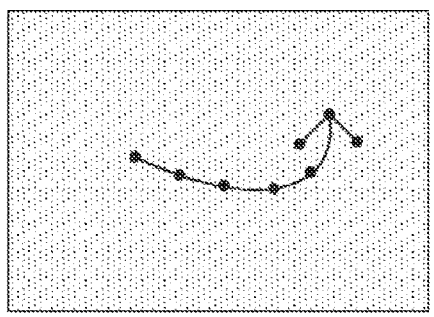
FIG.15D
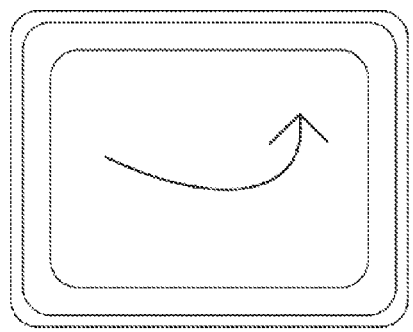
FIG.15E

CRADLE FOR MOBILE TELEPHONE, VIDEOPHONE SYSTEM, KARAOKE SYSTEM, CAR NAVIGATION SYSTEM, AND EMERGENCY INFORMATION NOTIFICATION SYSTEM

CROSS REFERENCE TO RELATED APPLICATIONS

This application claims priority under 35 U.S.C. 119 and 35 U.S.C. 365 based upon Japanese Patent Application No. 2008-097875, filed on Apr. 4, 2008 and upon Japanese Patent Application No. 2008-300118, filed on Nov. 25, 2008. The entire disclosures of the aforesaid applications are incorporated herein by reference.

FIELD OF THE INVENTION

The present invention relates to a mobile phone cradle to be used together with a mobile phone, audio-visual equipment, and a scanner remote controller that reads a dot pattern representing information on a medium and transmits the read information.

BACKGROUND OF THE INVENTION

Conventionally, a variety of devices have been proposed to be used with a mobile phone as an input and output device for expanding the function of the mobile phone or efficiently utilizing the function of the mobile phone.

There is provided a technique in which a pen-shaped scanner is used with a mobile phone in order to facilitate inputting of a character on the mobile phone without a full-size keyboard. (For example, refer to 'Nokia Digital Pen' (http://www.nokia.co.jp/about/release_071218.shtml) confirmed as of Mar. 31, 2008)

With this technique, if a user operates on a dedicated paper printed with a dot pattern using the pen-shaped scanner, the operation performed is transmitted via Bluetooth (registered trademark) from the scanner to the mobile phone where the operation is processed.

Also, mobile phones with VGA-class resolutions are increasingly used. (For example, refer to '3.0 inchi waido VGA ekisho wo tousai shita keitai denwa' (http://journal.mycom.co.jp/news/2007/01/16/004.html) confirmed as of Mar. 31, 2008).

SUMMARY OF THE INVENTION

Problem that the Invention is to Solve

However, with the above-described conventional technology that uses a pen-shaped scanner, since the screen of the mobile phone used with the pen-shaped scanner is small, the mobile phone is needed to be placed nearby so that the user can see the screen closely in order that a user handles processing while in visual contact with the screen.

For this reason, there is a problem in which it is hard to perform operation while placing the mobile phone on a cradle placed on a shelf or a desk for charging battery, and, as a result, the processing time depends on the battery capacity of the mobile phone.

Further, since the screen of a mobile phone is too small to handle an image of VGA-class resolution, some available models can connect to a wide screen television monitor for domestic use. However, there is also a problem in which directly connecting the mobile phone to the monitor requires time and effort to insert and remove a cable.

The present invention is devised in consideration of the above problems. The object of the invention is to realize a mobile phone cradle to be used with a mobile phone, audio-visual equipment, and a scanner remote controller that reads a dot pattern representing information on a medium and digitally transmits the read information.

Advantage of the Invention

As described above, the mobile phone cradle of the invention is to be used with a scanner remote controller that reads a dot pattern, on a medium, in which a code and/or an XY coordinate value associated with information or an operation instruction are recorded, and transmits the information. The mobile phone cradle comprises: being capable of having a mobile phone placed thereon and holding the mobile phone and communicating with the placed mobile phone; receiving data from the scanner remote controller to cause the scanner remote controller to function as input means for the mobile phone; and communicating with audio-visual equipment and controlling the audio-visual equipment to cause the audio-visual equipment to function as output means for the mobile phone.

Therefore, the invention has an advantage that an image can be displayed widely using a large screen instead of a small screen and small input buttons of a mobile phone.

The invention also has an advantage that using a scanner remote controller and an appropriately sized medium, instead of small buttons of a mobile phone, facilitates inputting.

The invention further has an advantage that, at happy time at home, a plurality of people can commonly use functions (e.g., shopping, video-on-demand, game, netsurfing, etc.) of a mobile phone even with one mobile phone.

The invention still further has an advantage that a photograph imaged outdoor utilizing portability of a mobile phone or a mail can be viewed on a large screen.

The invention yet further has an advantage that a single mobile phone can be sufficient in all locations by eliminating separation of use cases, such as a mobile phone, for outside use, a PC in a den, and an Internet television and a cable television in a living room. Other features and advantages of the present invention will become apparent from the following detailed description, taken in conjunction with the accompanying drawings, which illustrate, by way of example, the principles of the invention.

BRIEF DESCRIPTION OF THE DRAWINGS

FIGS. 8A to 8C are diagrams illustrating a dot pattern used with the handwriting input and output system that is the embodiment of the invention (5).

FIGS. 9A to 9D are diagrams illustrating a dot pattern used with the handwriting input and output system that is the embodiment of the invention (6).

FIGS. 10A to 10C are diagrams illustrating a direction dot used with the handwriting input and output system that is the embodiment of the invention.

FIGS. 11A to 11C are diagrams illustrating a dot pattern used with the handwriting input and output system that is the embodiment of the invention (7).

FIGS. 13A to 13E are diagrams illustrating the function of the imaging unit used with the handwriting input and output system that is the embodiment of the invention (1).

FIGS. 14A to 14C are diagrams illustrating the function of the imaging unit used with the handwriting input and output system that is the embodiment of the invention (2).

FIGS. 15A to 15E are diagrams illustrating a first operation of the handwriting input and output system that is the embodiment of the invention.

DESCRIPTION OF NUMERALS AND SIGNS

1 MEDIUM
2 G REMOCON (SCANNER REMOTE CONTROLLER)
3 MOBILE PHONE
3b MOBILE PHONE
4 CRADLE (MOBILE PHONE CRADLE)
4b CRADLE (MOBILE PHONE CRADLE)
5 AUDIO-VISUAL EQUIPMENT, TELEVISION RECEIVER, CAR NAVIGATION SYSTEM
6 DISPLAY
7 SERVER
8 PERSONAL COMPUTER
9 IMAGING UNIT
10 PROJECTION FOR INSTRUCTION
11 TRANSMISSION UNIT
12 TRANSMISSION BUTTON
13 RETRANSMISSION BUTTON
14 MICROPHONE
15 AUDIO PLAY BUTTON
16 PEN
17 PEN-STORING BUTTON
18 GUIDE LIGHT
19 LENS
20 LED
21 C-MOS SENSOR
22 PCB
23 PAPER CONTROLLER
101 DOT PATTERN
102 KEY DOT
103 INFORMATION DOT
104 REFERENCE GRID POINT DOT
105 VIRTUAL GRID POINT

DETAILED DESCRIPTION OF THE INVENTION

Best Mode for Carrying Out the Invention

An embodiment of the invention is described as follows with reference to FIGS. 1 and 2.

Overview of System Configuration 1

Figure 1:
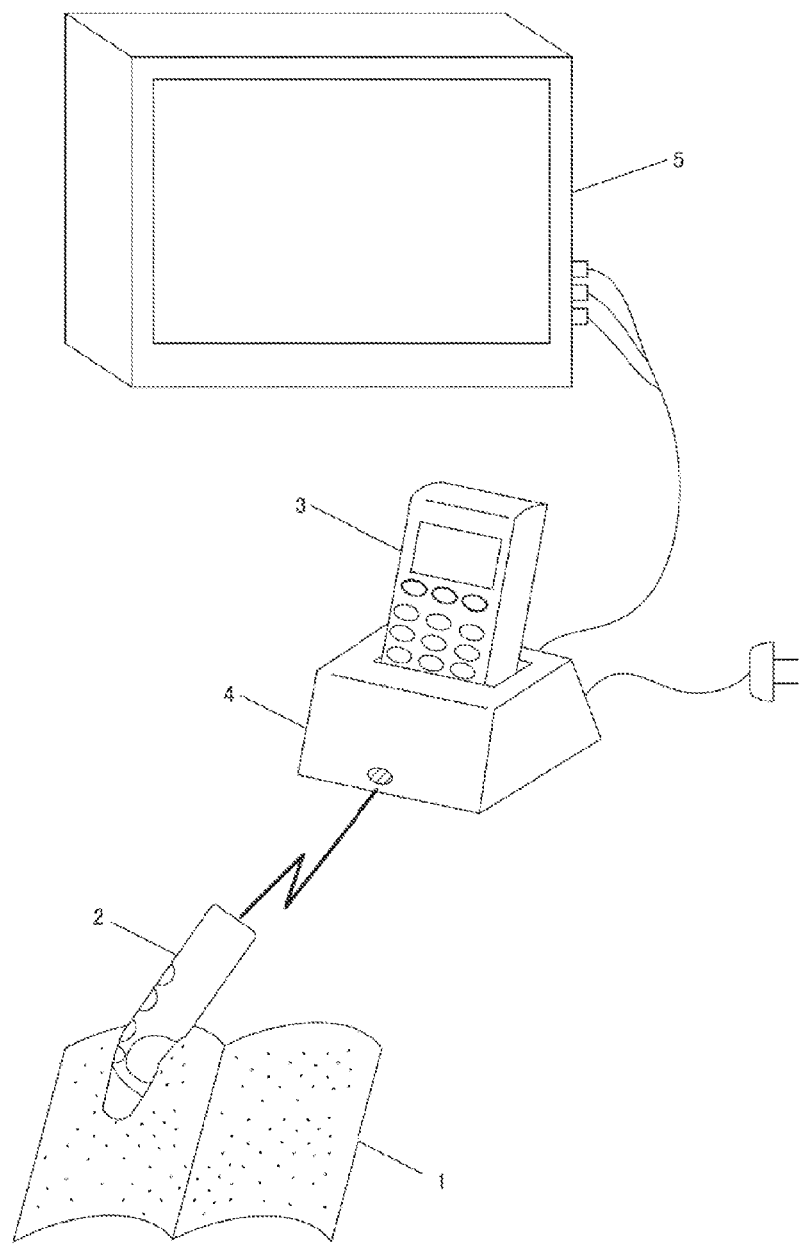
FIG. 1 is a diagram showing an embodiment of the invention and the overall configuration of the system using the mobile phone cradle.

FIG. 1 shows the overall configuration of the system using the mobile phone cradle of the invention.

A medium 1 and a scanner remote controller 2 (hereafter, abbreviated as "G remocon" as a remote controller for reading a grid-style dot pattern) are at a user's hand. A mobile phone 3 is placed on a mobile phone cradle 4 (hereafter, abbreviated as "cradle"), and the cradle 4 is connected to audio-visual equipment 5.

As an medium 1, a paper medium or the like is considered, on which surface a dot pattern representing information is formed by printing or other methods.

For example, there can be used: a paper controller in which a dot pattern representing an execution instruction and an icon image representing a function corresponding to the execution instruction are arranged by being superimposed and printed on the paper surface; a paper keyboard whose icon image represents keys of ordinary keyboards; a paper touch panel whose surface is printed with a dot pattern representing XY coordinate values; a tablet, and the like.

Also, as a medium 1, for example, there may be considered a mail-order catalog or a cable television directory on which a dot pattern is superimposed and printed with an image representing one function or meaning to a user.

It should be noted that, as a dot pattern, the dot patterns described in U.S. Pat. No. 3,706,385 or U.S. Pat. No. 3,771,251 may be used. These dot patterns record codes and/or XY coordinate values associated with information and/or operation instructions (control instructions).

This information is used by a mobile phone 3 and/or audio-visual equipment 5, and this operation instruction is for a mobile phone 3, a cradle 4 and/or audio-visual equipment 5.

A G remocon 2 has a battery, a scanner for reading a dot pattern, an analysis unit for analyzing an image of the read dot pattern and decoding the dot pattern to an XY coordinate values and a code value, and a transmission unit for transmitting the analysis outcome. It should be noted that a G remocon 2 may not have an analysis unit and the analysis may be performed by an analysis unit equipped in a mobile phone 3 or a cradle 4.

A mobile phone 3 is required to communicate an operation/control signal, input data, and an image/audio signal with a cradle 4 by being placed on the cradle 4. When a mobile phone 3 is placed on a cradle 4, the battery of the mobile phone 3 is preferably charged. Further, the electric power of the mobile phone 3 for performing a variety of processing is preferably provided from the cradle 4.

A cradle 4 is of a structure capable of holding a mobile phone 3 and provides electric power to charge the battery of the mobile phone 3 or to be used in processing by the mobile phone 3.

A cradle 4 further communicates an operation/control signal, input data, and an image/audio signal with the mounted mobile phone 3.

A cradle 4 still further communicates with a G remocon 2, retrieves an operation/control/processing instruction and input data targeted to a mobile phone 3 from G remocon 2, and passes onto the mounted mobile phone 3.

A cradle 4 yet further communicates with audio-visual equipment 5, receives an output image, output audio or the like as the result of processing by a mobile phone 3, a control signal and the like of audio-visual equipment from the mounted mobile phone 3, and outputs to audio-visual equipment 5.

It should be noted that, since a cradle 4 is required to be capable of providing electric power to the mounted mobile phone 3 for a long period of time, the power source is preferably a household electric power source or the like.

Further, similarly to the case of a docking station used with a laptop PC, when many cables or the like are connected to a mobile phone 3 of small body, a special compact connector or the like should be used. However, using a cradle 4 as a mediator, a normal size cable connector can be used for connection, and it is also possible to equip a number of connectors on the cradle 4 side.

As audio-visual equipment 5, for example, a television receiver can be used.

For the connection between a G remocon 2 and a cradle 4, an infrared ray, Bluetooth, a faint radio wave, or other wireless method can be used. It should be noted that, while infrared rays can be used as with conventional remote controllers, it is preferable to used Bluetooth or faint radio waves to enhance flexibility when using a G remocon 2.

FIG. 1 shows how radio waves and infrared rays emitted from the transmission unit of a G remocon 2 are received by the receiving unit of a cradle 4. FIG. 1 illustrates that the cradle 4 has the receiving unit on its surface in consideration of easier comprehension. This is a configuration employed when the material making the cradle 4 body does not transmit infrared rays or the like, and, in such a case, at least part of the receiving unit is provided on the surface of the body. When using radio waves that are transmitted through the body, the receiving unit is not required to be provided on the surface.

Further, for the communication between a cradle 4 and audio-visual equipment 5, IEEE1394 standard (e.g., i.LINK, FireWire), an infrared ray, Bluetooth, a faint radiowave, other wired or wireless communication methods can be used. It should be noted that, in a system compliant IEEE1394, a cable connects the cradle 4 and audio-visual equipment 5, and data is transmitted to audio-visual equipment 5 to control the audio-visual equipment 5 via the cable.

While FIG. 1 shows an example where a cable that has three connectors for connecting with the audio-visual equipment 5 side is used to connect a cradle 4 and audio-visual equipment 5, the cable shape is not limited to this.

It should be noted that, when using infrared rays for a connection between a cradle 4 and audio-visual equipment 5, if infrared emitting LEDs are provided at some three parts of the circumference of the cradle 4, a control signal of audio-visual equipment 5 can be appropriately transmitted by placing the cradle 4 before the monitor of audio-visual equipment 5, such as a television receiver.

Structure of Cradle 4

A cradle 4 has an ordinary live part for mobile telephone, a communication unit for communicating with audio-visual equipment 5, a communication unit for communicating with a mobile phone 3, a communication unit for communicating with a G remocon 2, and a control unit for forwarding, processing, or converting a signal transmitted between the communication units.

The function of the live part for mobile telephone is an ordinary function for charging a mobile phone, and, thus, the description is omitted.

Further, the function of the control unit is an information processing function by an ordinary microcomputer and can be realized by designing by ordinary programming, and, thus, the description is omitted. The control unit is, in principle, composed of: a signal identification unit that identifies a signal input from a G remocon 2, mobile phone 3, and audio-visual equipment 5; a storing unit that stores a table and a program defining how to process the identified signal in advance; a process determining unit that searches the storing unit using the signal identified by the signal identification unit and determines the defined process; a processing unit that fabricates or processes input data (computer processable data including image data, audio data, and the like) according to the determination of the process determining unit; and an output unit that outputs the processing outcome of the processing unit to an appropriate output destination (each communication unit described above).

It should be noted that, as in the following application example, the control unit may also have a camera. In such a case, the control unit (a processing unit) retrieves an image from outside through the camera, processes the retrieved image, and outputs to a mobile phone 3 and/or audio-visual equipment 5.

Variant of System Configuration

The above-described system configuration has an advantage that, since a G remocon 2 communicates with a cradle 4, a mobile phone 3 itself is not required to have communication means for communicating with the G remocon 2.

Figure 2:
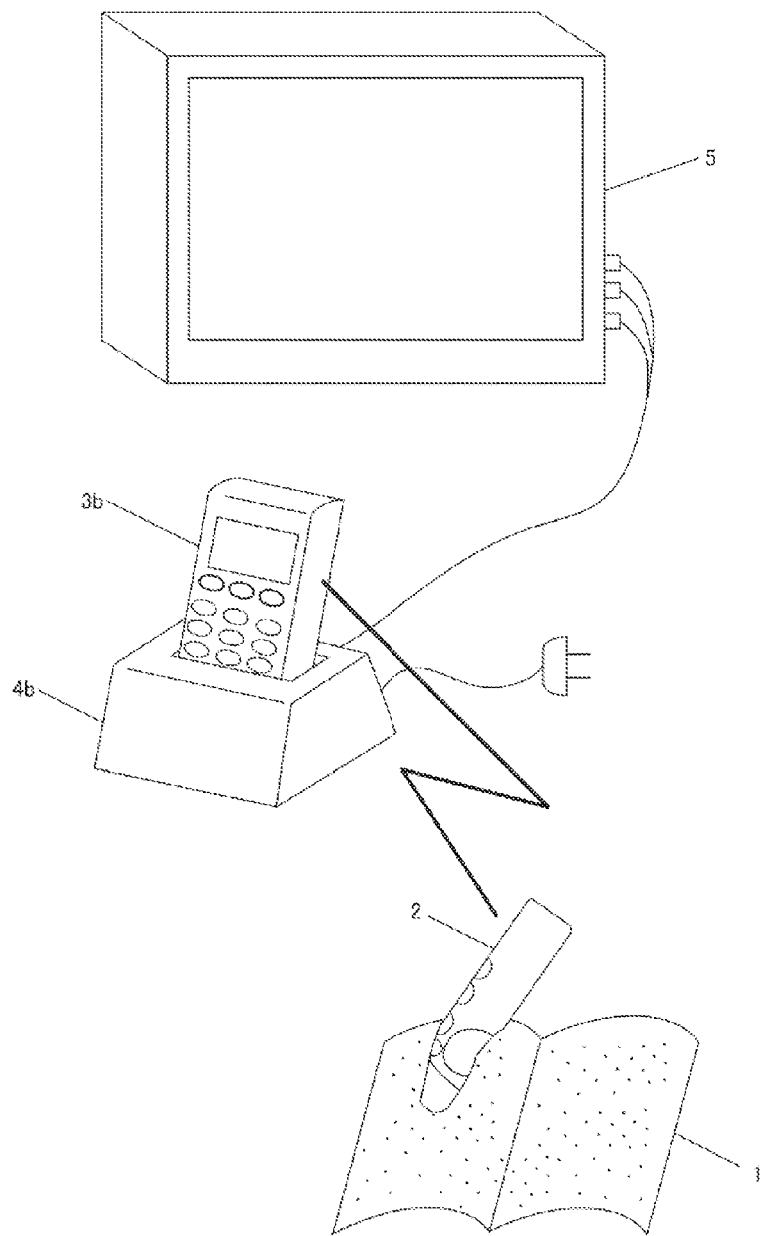
FIG. 2 is a diagram showing a variant of the embodiment of the invention and how G remocon directly communicates with a mobile phone.

However, as there are not a few mobile phones 3*b* that utilize Bluetooth among currently distributed mobile phones 3, a G remocon 2 may directly communicates with a mobile phone 3*b* as shown in FIG. 2.

Using such a configuration can eliminate communication means of a cradle 4*b* for communicating with a G remocon 2, then, the production cost of a cradle 4 can be cut down.

Application Example 1

Controlling Audio-visual Equipment

A method for controlling audio-visual equipment 5 by a user using a G remocon 2 is described.

First, a user touches with a G remocon 2 an icon of a paper controller 1 signifying a command for turning the power of a television receiver 5 ON.

The G remocon 2 reads out an image including a dot pattern of the touch position, extracts the dot pattern, and decodes the dot pattern into a code that turns the power of the television receiver 5 ON.

Next, the G remocon 2 transmits the decoded code to a cradle 4.

The cradle 4 passes the code received from the G remocon 2 to a mobile phone 3, or transmits directly to the television receiver 5.

If the mobile phone 3 receives a code from the cradle 4, the mobile phone 3 may pass the code again to the cradle 4 after performing a predetermined processing.

The cradle 4 transmits the code to the television receiver 5.

The television receiver 5 that has received the code is activated just as being turned ON by an ordinary remote controller.

While the above description describes a case of turning the power ON, instructions, such as powering OFF, input-switching of the television receiver 5, and selecting a television program, may be carried out in a similar manner.

While a control code may be transmitted directly from the G remocon 2 to the television receiver 5, by interposing the cradle 4 or the mobile phone 3, a variety of code conversion processing, such as converting the meaning of a code, can be performed.

Application Example 2

Karaoke

Karaoke using a mobile phone can be realized by attaching a microphone (audio input means) on a G remocon 2 so that a sound input by the microphone is also transmitted directly to a mobile phone 3 or through a cradle 4 to realize a karaoke function on the mobile phone 3.

For example, when selecting music, a user selects the music using a G remocon 2 while referring to a printed music list at hand, then sings a song using the microphone of the G remocon 2.

An image and a word output from the mobile phone 3 are output to audio-visual equipment 5, and the user's voice input into the microphone is output from the audio-visual equipment 5 through at least the G remocon and the cradle 4.

The user can enjoy karaoke while viewing the output image and word on the television monitor 5.

Application Example 3

Data Input by Voice Recognition

By attaching a microphone to a G remocon 2, sound information input by the microphone can be, through voice recognition processing, a regular operation/control instruction and/or input data to be processed by a mobile phone 3. Processing of input data in the mobile phone 3 includes a case in which a program executed on the mobile phone 3 processes the input data and a case in which data input as an instruction for controlling the mobile phone 3 is interpreted and the instruction is executed.

In such a case, for example, sound information "Terebi dengen on" in Japanese meaning "TV power ON" is processed in the mobile phone 3 in the same manner as when a character string "TV power ON" is input from a paper keyboard, a handwriting input using a pen or the like, and transmitted from the mobile phone 3, through the cradle 4, to a television receiver 5 as audio-visual equipment 5 as an instruction of turning the power of the television receiver 5 ON.

It should be noted that if the G remocon 2 has voice recognition processing means, the processed character string is transmitted to the cradle 4 or the mobile phone 3. If the cradle 4 has voice recognition processing means, sound information is transmitted from the G remocon 2 to the cradle 4, converted to a character string in the cradle 4, and then transmitted to the mobile phone 3. If the cradle 3 has voice recognition processing means, sound information is transmitted directly from the G remocon 2 or through the cradle 4 to the mobile phone 3, and converted into a character string and processed in the mobile phone 3.

Application Example 4

Videophone

As currently available mobile phones 3 have a videophone function, an image and a sound from the other side of telephone can be output from a television receiver 5 through a cradle 4, a sound from this side of telephone can be input from a microphone equipped on a G remocon 2, and an image from this side of telephone can be input from a camera equipped on the mobile phone 3 or the cradle 4.

The image of the other side of telephone can be viewed on a wide monitor, the sound thereof can be listened with a high-performance speaker, the sound of this side of telephone can be input with an easy-to-carry microphone, and the image thereof can be captured by a fixed camera, thereby improving quality of input and output interfaces of the videophone.

It should be noted that an image from this side may be captured using a camera equipped on the mobile phone 3 or using a camera attached on the cradle 4. Depending on the model of a mobile phone 3, when the mobile phone 3 is placed on a cradle 4, the imaging direction of the camera of the mobile phone 3 may not properly capture the user. In such a case, the camera provided on the cradle 4 facilitates an optimal videophone conversation.

Application Example 5

Input from Audio-Visual Equipment to Mobile Phone

Multimedia contents reproduced by audio-visual equipment 5 may be transmitted through a cradle 4 to a mobile phone 3. Since some mobile phones 3 have a function as a music player, the mobile phones 3 can carry the contents by having the contents transferred from the audio-visual equipment 5.

Application Example 6

Automatic Controlling of Audio-Visual Equipment

If a cradle 4 is connected with audio-visual equipment 5 in a way that allows the cradle 4 to have an automatic control function, the audio-visual equipment 5 can be automatically controlled.

Application Example 7

Transmission from Cradle to G Remocon

If the cradle 4 has a transmission function of data or the like from the cradle 4 to a G remocon 2, the G remocon 2 can be controlled based on the transmitted data.

Application Example 8

One-Segment Broadcasting

If a mobile phone 3 can receive one-segment broadcasting, the image thereof can be output from audio-visual equipment 5 through a cradle 4. A moving image can also be output in a similar way.

Application Example 9

Mobile Phone Operation

Using a G remocon 2 and a paper controller allows all mobile phone operations to be performed while a mobile phone 3 is still placed on cradle 4.

Application Example 10

On-Demand Service

As the monitor screen of audio-visual equipment 5 is large, on-demand service for mobile phone 3 can be comfortably used. Browsing Web, viewing/listening a photograph and a motion picture/a sound stored in the mobile phone, playing a game, and shopping can also be done in a similar way.

Application Example 11

Associating with Map

Using a map with XY coordinate values recorded thereon as medium 1 allows associating the map with a mobile content. Further, a user can enjoy the map with a wide screen monitor or the like.

Application Example 12

Input by Character Recognition

Figure 23:
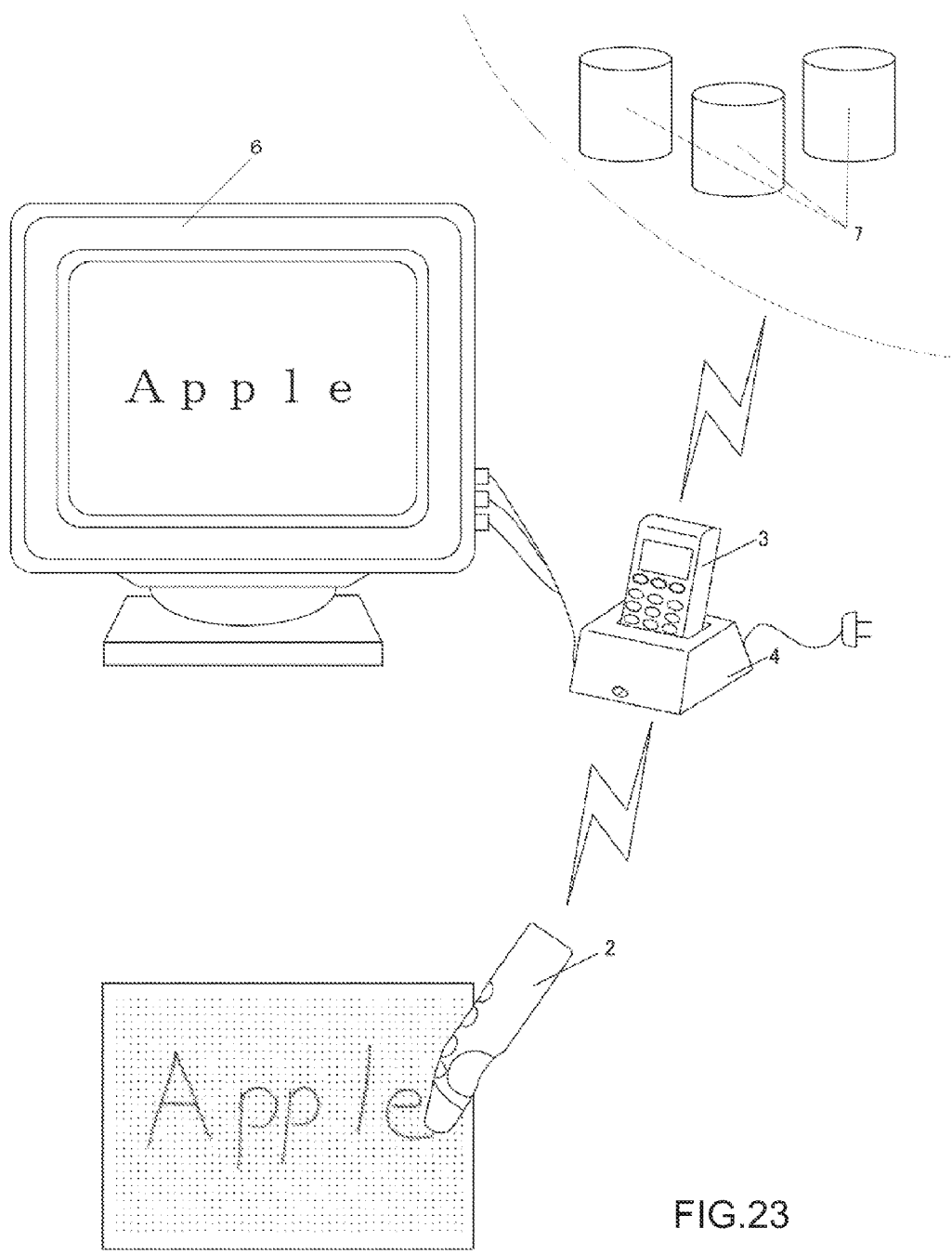
FIG. 23 is a diagram for illustrating the handwriting input and output system using the mobile phone cradle that is the embodiment of the invention.

As shown in FIG. 23, handwriting input is made possible using a paper on which a dot pattern is printed in advance and by drawing a character by a pen-shaped G remocon 2 and reading XY coordinate values that represent the trajectory of the character.

Application Example 13

Searching Keyword

By specifying a key word, such as "soap opera" or "sport program," from a paper controller or a television directory, a user can search or reserve recording a preferred program. Searching may be done by broadcasting time or time and date.

Application Example 14

Automatic Switching of Television Screen, Automatic Power ON

When a mobile phone 3 receives an incoming call or the mobile phone 3 detects a signal while a user is viewing a television program, a cradle 4 may automatically switch the monitor screen from displaying of the viewing content to displaying of a content output from the mobile phone 3. IEEE1394 standard or an infrared ray can be used for instructing from the cradle 4 to the audio-visual equipment 5.

The content displayed by switching may be: the one stored in advance in the mobile phone 3; the one stored in advance in the television receiver 5; or a content received by the mobile phone 3 or the television receiver 5 from a new channel selected at switching.

Further, the cradle 4 may be configured so that, even when the power of the television receiver 5 is OFF, if the mobile phone 3 receives an incoming call, the power of television receiver 5 may automatically become ON and the monitor screen displays the output from the mobile phone 3.

Having such a configuration allows, at receiving of disaster information, prompt switching and activating an alarm of large sound from audio-visual equipment 5 capable of reproducing a large sound.

If a fixed camera and a large speaker are equipped, the system can be used to confirm safety of elderly people who are living alone. The fixed camera cannot be moved carelessly by elderly people, and the large speaker can send information to even hearing-impaired elderly people using a large sound.

The system can also be used by a parent in a rural area to wake up a child living alone in city. The parent rings up in morning and the incoming call makes a large sound alarm via audio-visual equipment 5, which reliably prevents the child from oversleeping.

Application Example 15

Using Plurality of G Remocons with IDs

Using a plurality of G remocons 2 with allocated IDs allows a plurality of users to customize respective use environments.

If all family members have their own G remocons 2 respectively, when a television squabble occurs, the selection of father can always be given priority by processing with prioritization using an identification allocated to each G remocon.

In an audience participating program of terrestrial digital broadcasting or the like, each audience can input answer, such as "Yes," "No," or "Other," in a quiz or Q&A.

By matching the allocated ID and the unique ID of the mobile phone when inputting personal information, the system can also be applied to a medical care or the like.

The system is also suitable for a purpose such as having a questionnaire at a meeting place.

Application Example 16

Car Navigation System

As an embodiment combining the above application examples, a car navigation system can be considered. In this case, a car navigation system 5 as audio-visual equipment 5 is controlled by a G remocon 2. Further, the car navigation system can also be used as a karaoke system. It goes without saying that data can be input by means of voice recognition. When driving, the videophone may be used by passengers other than the driver.

Drive data and neighboring facility information stored in the car navigation system may be input into a mobile phone. Further, data can be efficiently input into the car navigation system 5 by inputting in advance necessary navigation information into the mobile phone and mounting the mobile phone on a cradle 4. The broadcasting content of one-segment broadcasting received by the mobile phone 3 can be output to the screen of the car navigation system 5.

It is also considered that, in a winter morning, by calling the mobile phone 3 placed on the cradle 4, the engine connected to the audio-visual equipment 5 can be activated to warm air.

The system 5 can be controlled without interrupting driving by touching a largely printed paper controller using a G remocon 2 and receiving audio responses from the system 5.

Instead of mounting the car navigation system in advance in a car, a car navigation system implemented on a mobile phone 3 may be connected to a monitor 5 equipped in a car. In such a case, compared with the case in which an expensive car navigation system is equipped on a car that is not used very often, the usage frequency of the navigation system can be increased as the mobile phone 3 is easily carried around.

It should be noted that the shape of the cradle 4 may take the shape of a car dashboard that holds a mobile phone 3 by being inserted the mobile phone 3 in the dashboard part.

Other

In the above description, while a mobile phone was used to describe as an example, the invention is not limited to a mobile phone and may be valid for other mobile devices having a communication function, such as PDA.

Further, while the description uses audio-visual equipment 5 with a wide screen monitor as an example, a medium-sized monitor may be connected in a den and a mobile phone 3 may be used instead of a PC.

The invention is not limited to the embodiments described above, and may vary within the scope of the appended claims. That is, embodiments obtained by combining technical means modified as necessary within the scope of the claims also fall in the technical scope of the invention.

Handwriting Input

Figure 3:
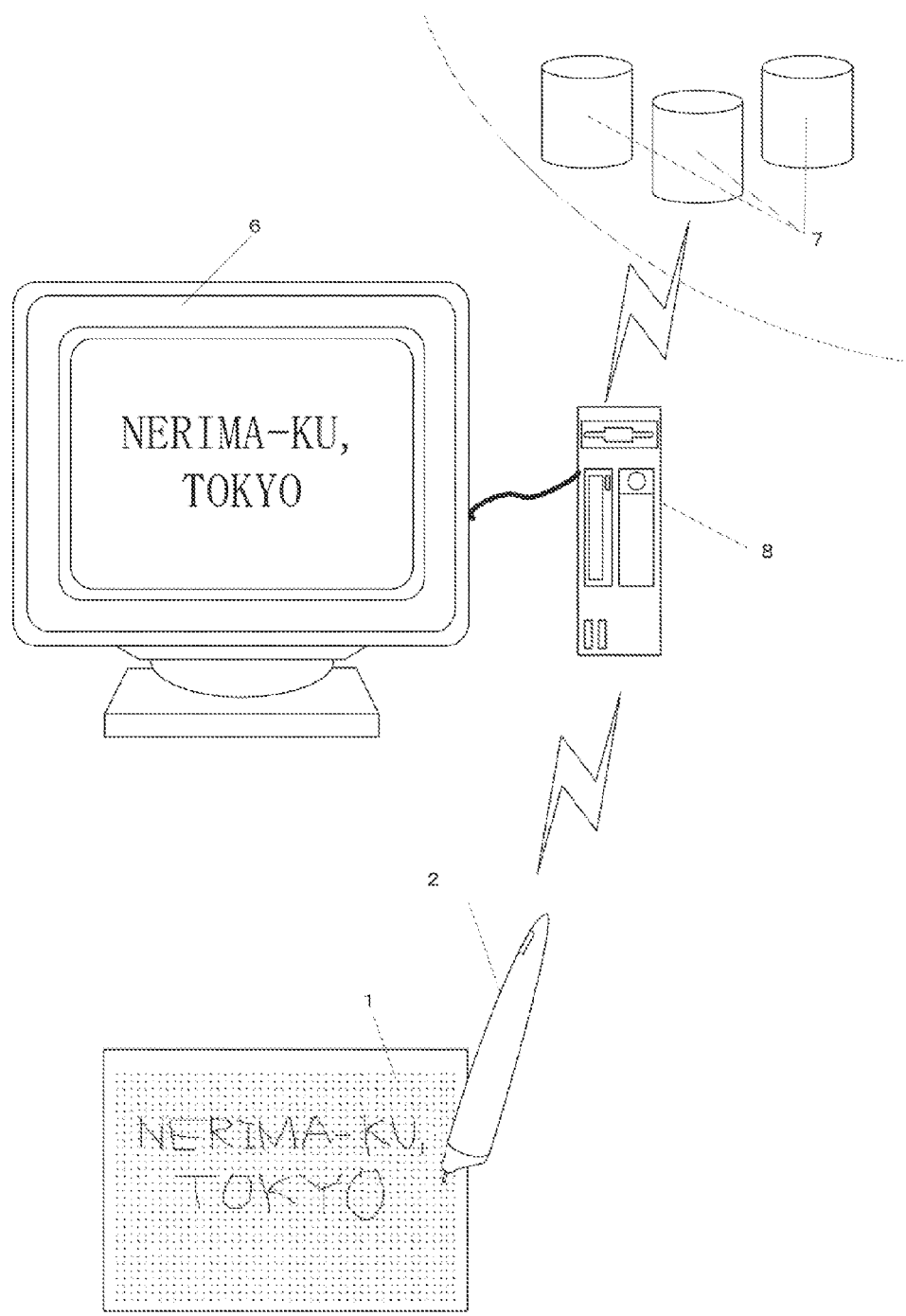
FIG. 3 is an external view showing a use condition of a handwriting input and output system that is an embodiment of the invention.

Further, FIG. 3 is an external view showing one example of how the handwriting input and output system using a G remocon 2 of the invention is used. According to FIG. 3, if a medium 1 is written using the G remocon 2, the text as having been written is displayed on a display 6. This is realized when the G remocon 2 images a dot pattern on the written trajectory and a personal computer 8 analyzes (and accesses server 7 if necessary) the dot pattern. However, the personal computer 8 may be embedded in the G remocon 2.

Dot Pattern

Referring to FIGS. 4 to 11C, the following describes a dot pattern used in the handwriting input and output system 1 of the invention.

Description of Dot Pattern

GRID 1

FIGS. 4 to 11C are explanatory diagrams showing GRID1 as an example of a dot pattern formed on a medium 1 in the invention.

It should be noted that in these diagrams, grid lines in horizontal and vertical directions are added for convenience of description, and do not exist in an actual printing surface. If a G remocon 2 as imaging means has an infrared irradiation means, a key dot 102, an information dot 103, a reference grid point dot 104 and the like constituting a dot pattern 101, are preferably printed with an invisible ink or a carbon ink that absorbs the infrared light.

Figure 4:
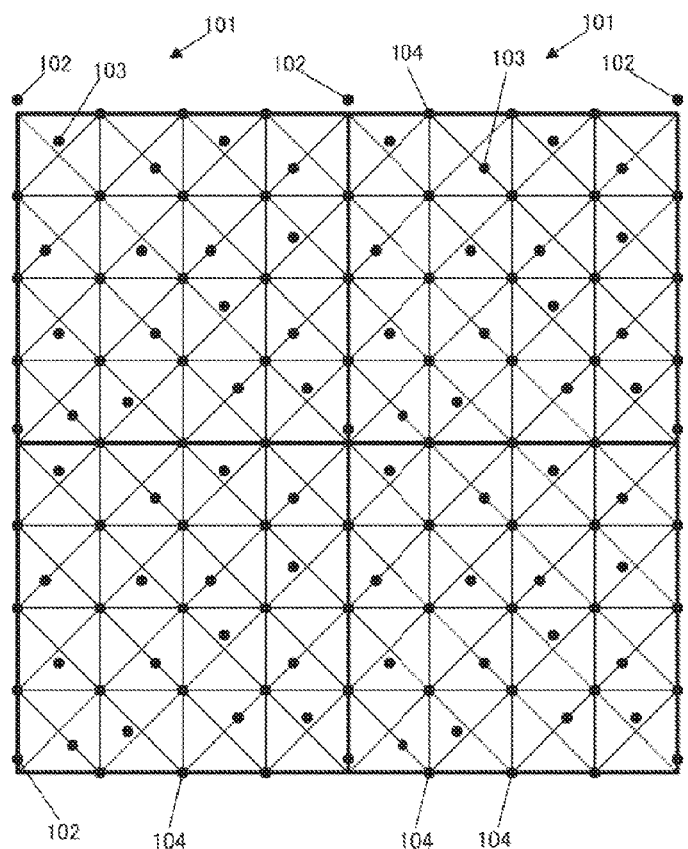
FIG. 4 is a diagram illustrating a dot pattern used with the handwriting input and output system that is the embodiment of the invention (1).
Figure 5A:
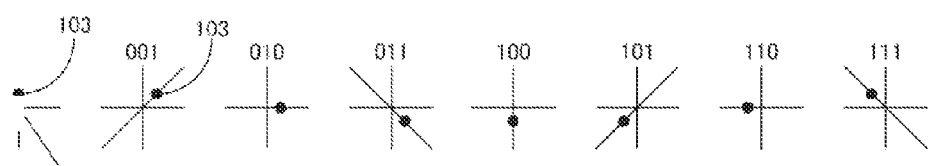
FIGS. 5A and 5B are diagrams illustrating a dot pattern used with the handwriting input and output system that is the embodiment of the invention (2).
Figure 5B:
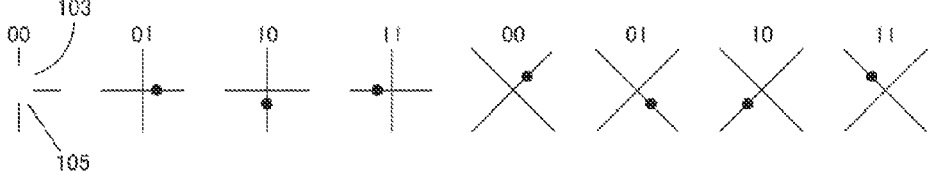

FIG. 4 is an enlarged view showing an example of information dots of a dot pattern 101 and bit expression of data defined therein. FIGS. 5A and 5B are explanatory diagrams showing information dots 103 arranged with key dots 102 located in the centers.

The information input and output method using the dot pattern comprises means for generating a dot pattern 101, means for recognizing the dot pattern 101, and means for outputting information and a program from the dot pattern 101. That is, after retrieving a dot pattern 101 as image data with an imaging unit 7 embedded in a G remocon 2, first, the method extracts a reference grid point dot 104, then, extracts a key dot 102 based on the fact that there is no dot at the location where a reference grid point dot 104 supposed to be, extracts an information dot 103, digitizes the information dot 103 to extract an information region, converts the information into numerical values, and outputs information and a program from this dot pattern 101 based on the numerical information. For example, the method outputs information, such as a sound, and a program from this dot pattern 101 to an information output device, a personal computer, a PDA, a mobile phone, or the like.

To generate a dot pattern 101, based on a dot code generation algorithm, fine dots, used for recognition of numerical information, including key dots 102, information dots 103, and reference grid point dots 104, are arranged in accordance with a predetermined rule. As shown in FIG. 4, in a block of a dot pattern 101 that represents information, 5×5 reference grid point dots 104 are arranged with reference to a key dot 102, and an information dot 103 is arranged around a virtual grid point 105 that is at the center surrounded by the four reference grid point dots 104. Arbitrary numerical information is defined in this block. The illustrative example of FIG. 4 shows a case where four blocks of a dot pattern 101 are arranged in parallel (in bold frame), provided, however, that the dot pattern 101 is not limited to four blocks and may be arranged repeatedly as many times as needed in lateral and longitudinal directions.

When an imaging unit 9 retrieves this dot pattern 101 as image data, reference grid point dots 104 can calibrate a distortion of a lens of the imaging unit 9, skewed imaging, expansion and contraction of a paper surface, curved medium surface and distortion during printing. Specifically, a function for calibration $(Xn, Yn)=f(Xn', Yn')$ is calculated for converting distorted four reference grid points 104 into the original square, then the vector of the correct information dot 103 is calculated by calibrating an information dot 103 by the same function.

If reference grid point dots 104 are arranged in a dot pattern 101, since image data of the dot pattern 101 retrieved by the imaging unit 9 can be calibrated its distortion attributable to the imaging unit 9, image data of the dot pattern 101 can be accurately recognized even when the image data is retrieved by a popular camera with a lens of high distortion rate. Moreover, even when the dot pattern 101 is read out by an imaging unit 9 inclined with reference to a surface of the dot pattern 101, the dot pattern 101 can be accurately recognized.

Key dots 102 are dots, as shown in FIG. 4, arranged by shifting four reference grid point dots 104 that are located at the four corners of a block, in a certain direction. The key dot 102 is a representative point of a block of a dot pattern 101 that represents an information dot 103. For example, the key dots are dots obtained by shifting reference grid point dots 104 that are located at the four corners of a block of a dot pattern 101 by 0.1 mm upward. However these numbers are not limited to these, and may vary depending on the size of a block of a dot pattern 101.

Information dots 103 are dots used for recognition of a variety of information. The information dot 103 is arranged around a key dot 102 as a representative point, as well as at the ending point of a vector expressed with a starting point being a virtual grid point 105 that is at the center surrounded by four reference grid point dots 104. For example, the information dot 103 is surrounded by reference grid point dots 104 and, as shown in FIG. 5A, since the dot 0.1 mm apart from the reference grid point 105 has direction and length when expressed as a vector, the information dots 103 expresses 3 bits by being disposed in eight directions by being rotated by 45 degrees each in clockwise direction. As a result, one block of a dot pattern 101 can express 3 bits×16=48 bits.

FIG. 5B is a method for defining an information dot 103 having 2 bits for each grid, in a dot pattern of FIG. 4. Each grid defines information of 2 bits by shifting a dot in + direction and × direction. In this way, although 48 bits information can be defined indeed, data can be allocated to each 32 bits by dividing for an intended purpose. Maximum of $2^{16}$ (approximately 65,000) patterns of dot pattern formats can be realized depending on the combination of + direction and × direction.

It should be noted that arrangement is not limited to this and may vary including a possibility of 4-bit expression by arranging dots in 16 directions.

Preferably, the dot diameter of a key dot 102, information dot 103, or reference grid point dot 104 is approximately 0.05 mm in consideration of viewing quality, printing accuracy in respect of a paper property, resolution of an imaging unit 9, and optimal digitization.

Also, the gap between reference grid point dots 104 is preferably approximately 0.5 mm in both vertical and horizontal directions in consideration of information amount required for an imaging area and possible false recognition of dots 102, 103, and 104. In consideration of false recognition of reference grid point dots 104 and information dots 103, disalignment of a key dot 102 is preferably around 20% of the grid gap.

The gap between the information dot 103 and a virtual grid point that is surrounded by four reference grid point dots 104 is preferably the gap approximately 15 to 30% of a distance between adjacent virtual grid points 105. If the distance between an information dot 103 and a virtual grid point 105 is shorter than this gap, dots are easily recognized as a big cluster, degrading the visual quality as a dot pattern 101. On the other hand, if the distance between an information dot 103 and a virtual grid point 105 is longer than this gap, the judgment as to which one of the adjacent virtual grid point 105 is the center of a vector of the information dot 103 becomes difficult.

As shown in FIG. 4, one dot pattern is a dot pattern composed of 4×4 block regions, and an information dot 103 of 2 bits is disposed in each block. The dot-code format of this information dot 103 is shown in FIG. 6.

Figure 6:
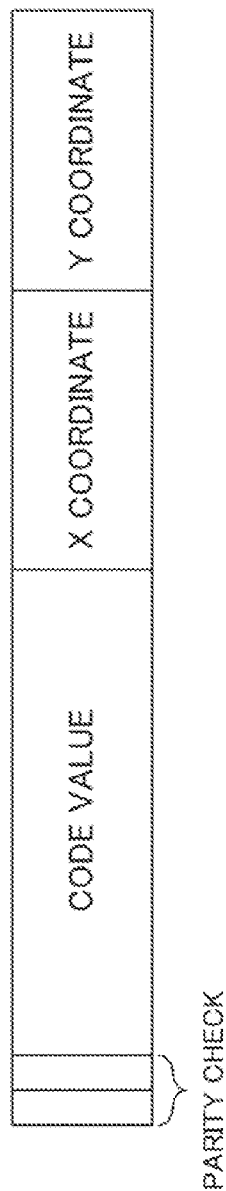
FIG. 6 is a diagram illustrating a dot pattern used with the handwriting input and output system that is the embodiment of the invention (3).

As shown in FIG. 6, one dot pattern registers a parity check, a code value, an X coordinate, and a Y coordinate. It should be noted that the details of the format are described later.

Figure 7:
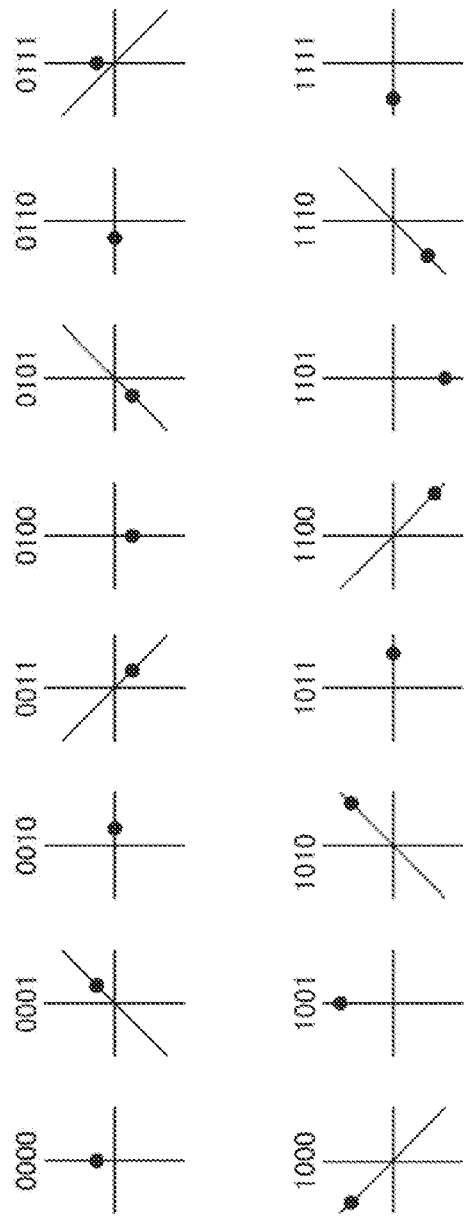
FIG. 7 is a diagram illustrating a dot pattern used with the handwriting input and output system that is the embodiment of the invention (4).

FIG. 7 is an example of information dot 103 and bit expression of the data defined therein, and shows another embodiment.

Information dots 103 can express 4 bits if two types of information dots, long and short distance ones from a virtual grid point 105 that is surrounded by reference grid point dots 104, are used, and vector directions are eight directions. Here, the long distance of the information dots 103 is preferably approximately 25 to 30% of the distance between adjacent virtual grid points 105, and the short distance, approximately 15 to 20%. However, the gap between the centers of the long and short distance information dots 103 is preferably longer than the diameters of these dots.

The information dot 103 surrounded by four reference grid point dots 104 is preferably one dot in consideration of visual quality. However, if the visual quality is disregarded and information amount is required to be large, one bit can be allocated to each vector and information dot 103 can be expressed by a plurality of dots thereby expressing a great amount of information. For example, with vectors of eight concentric directions, an information dot 103 surrounded by four grid dots 104 can express $2^8$ pieces of information, 16 information dots in one block accounts for $2^{128}$ pieces of information.

FIGS. 8A to 8C are examples of information dots and bit expressions of data defined therein. FIG. 8A is a diagram disposing two dots; FIG. 8B is a diagram disposing four dots; and FIG. 8C is a diagram disposing five dots.

FIGS. 9A to 9D show variants of a dot pattern 101. FIG. 9A is a schematic diagram of six information dot arrangement; FIG. 9B is a schematic diagram of nine information dot arrangement; FIG. 9C is a schematic diagram of 12 information dot arrangement; and FIG. 9D is a schematic diagram of 36 information dot arrangement.

The dot pattern 101 shown in FIG. 4 shows an example where 16 (4×4) information dots 103 are arranged in one block. However, this information dot 103 is not limited to disposing of 16 dots and may vary. For example, depending on the required information size and the resolution of an imaging unit 9, 6 (2×3) information dots 103 may be arranged in one block (FIG. 9A), 9 (3×3) information dots 103 may be arranged in one block (FIG. 9B), 12 (3×4) information dots 103 may be arranged in one block (FIG. 9C), or 36 information dots 103 may be arranged in one block (FIG. 9D).

Description of Dot Pattern

Direction Dot

Next, another embodiment of a dot pattern, a direction dot, is described with reference to FIGS. 10A to 10C.

This dot pattern defines the dot pattern's direction by the shape of its block. In FIG. 10A, reference points 201a to 201e are first arranged, and the line that connects these reference points 201a to 201e defines a shape showing the direction of the block (a pentagon oriented upward in this example). Based on these reference points, virtual reference points 201f, 201g, and 201h are arranged. An information dot 203 is disposed at the ending point of a vector that has a length and a direction when having the virtual reference point as the starting point. In this way, the direction of a block can be defined by how reference points are arranged, in FIG. 10A. In addition, the whole size of a block is also defined by the direction dot defining the orientation of the block. Further, it is appreciated that this block can be arranged repeatedly as many times as needed in lateral and longitudinal directions.

It should be noted that although the reference points $201a$ to $201e$ and information dot 203 were described as being the same shapes in FIG. 10A, reference points $201a$ to $201e$ may be larger than an information dot 203. Further, these reference points $201a$ to $201e$ may take any shape including a triangle, a square, or other polygons, as long as they can be distinguished from an information dot 203.

FIG. 10B defines information according to the fact whether or not an information dot exists on a virtual grid point of a block.

In FIG. 10C, two of the block shown in FIG. 10A are coupled, in horizontal and vertical directions respectively.

The dot pattern formed on a medium 1 is not limited to GRID1, and may be any dot pattern as long as that defines XY coordinate information and code information.

For example, dot patterns in U.S. Pat. No. 3,766,678 (GRID2), U.S. Pat. No. 3,858,051 (GRID3), and U.S. Pat. No. 3,858,052 (GRID4) can be used.

Description of Dot Pattern Format

FIGS. 11A to 11C are diagrams illustrating a dot pattern format formed on a medium 1 of the invention.

As shown in FIG. 11C, the dot pattern is a dot pattern configured by 4×4 block regions, and these blocks are divided into $C_{1-0}$ to $C_{31-30}$. FIGS. 11A and 11B show a dot code format of each region.

FIG. 11A is a format in which a page code, an X coordinate, and a Y coordinate are registered. The page code refers to the page number of a medium 1 when the medium 1 is a booklet or the like. The X coordinate and Y coordinate each means a position (a coordinate value) on a medium. In this way, when a user reads a medium 1 using a G remocon 2, the page number of the medium and the coordinate position of the read part are recognized simultaneously by one-time reading operation.

FIG. 11B is a format in which a page code, an action code, an X coordinate, and a Y coordinate are registered. The action code means an operation instruction. For example, the action code means "Zoom in," "Zoom out," and the like, and are mainly included in a dot pattern used in an icon region, which is described later.

In this way, the dot pattern of the invention can register a variety of code information and XY coordinates, such as a page code and an action code, in one format. Alternatively, the dot pattern can register only XY coordinates, or only code information, realizing a flexible format.

Imaging Unit

FIGS. 12A to 15E are diagrams illustrating an imaging unit 9 used in a handwriting input and output system.

It should be noted that the imaging unit 9 is preferably a size and a shape suitable to be hold in a person's hand, and particularly, a pen type shape, as in FIGS. 12A to 12D, is most preferable.

Figure 12A:
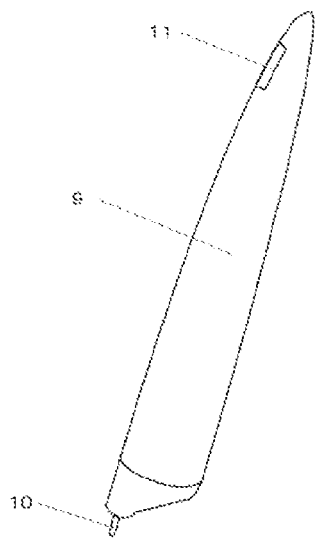
FIGS. 12A to 12D are external views showing the overall structure of an imaging unit used with the handwriting input and output system that is the embodiment of the invention.
Figure 12B:
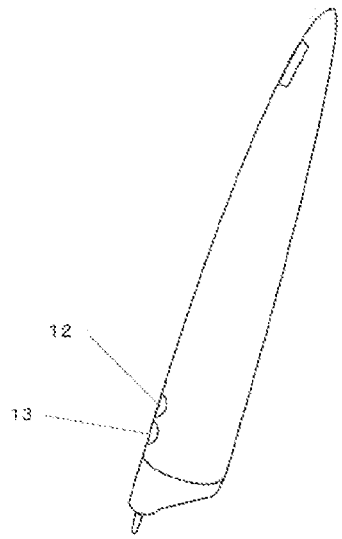
Figure 12C:
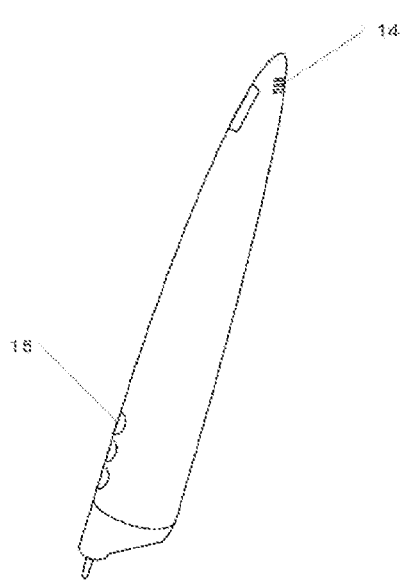
Figure 12D:
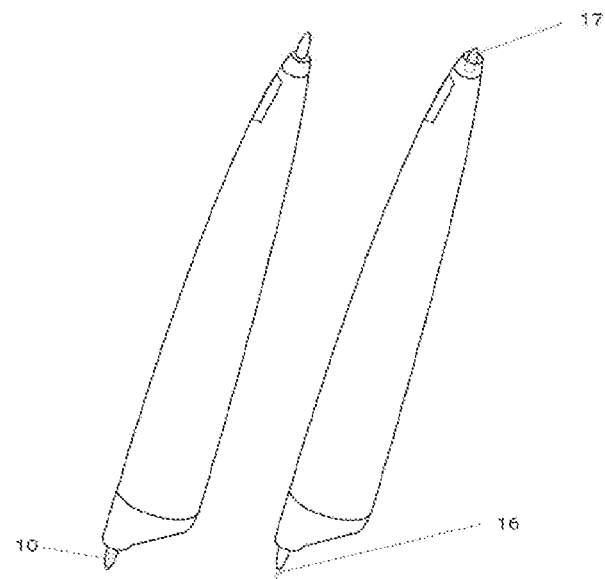

FIG. 12A is a diagram showing the most basic embodiment of a pen-shaped imaging unit 9. In this embodiment, a projection for instruction 10 and a transmission unit 11 are provided, and a C-MOS sensor or the like that is not shown is incorporated along the shaft line of the pen. A transmission unit 11 is for the imaging unit 9 to transmit a signal to other members using infrared communication, wireless communication and other methods. The transmission unit 11 is illustrated for convenience of description, while, in fact, the transmission unit 11 does not necessarily be provided at a location visible from outside.

FIG. 11B is a diagram showing another embodiment of a pen-shaped imaging unit 9. In this embodiment, two buttons are provided for accepting user operations. These two buttons are a transmission button 12 and a retransmission button 13, and a user can instruct by a button operation to the imaging unit 9 to transmit a signal to other members. Here, the retransmission button 13 is used to retransmit the same signal when the signal transmitted from the transmission button 12 cannot be transmitted to other members due to an existence of an interference or the like.

FIG. 11C is a diagram showing another embodiment of a pen-shaped imaging unit 9. In this embodiment, a microphone 14 for accepting an audio input from a user and an audio play button 15 are further provided. The microphone 14 is used for recording a sound to be used for voice recognition described later and the audio play button 15 is used for reproducing a voice guide described later.

FIG. 11D is a diagram showing another embodiment of a pen-shaped imaging unit 9. In this embodiment, a pen tip 16 is stored in the internal space of a projection for instruction 10, and the pen tip 16 appears by pressing of a pen-storing button 17.

FIG. 13A is a section view showing a distal portion of a G remocon 2 as one embodiment of an imaging unit 9. Such a G remocon 2 has a hollow portion formed inside, and comprises a guide light 18 having an opening portion at the leading end, a lens 19 disposed at a location opposing the opening portion of the guide light 18, an LED 20 (an irradiation unit) as a light source disposed on the same surface as the lens 19 and irradiating light of a predetermined wavelength on a medium surface where a dot pattern is formed, a C-MOS sensor 21 (an imaging element) disposed on a location receded from the lens 19, a PCB 22 at a location further receded from the C-MOS sensor 21, and a CPU that is not shown in FIG. 13A provided on the PCB 22. The hollow portion of the guide light 18 is formed in a tapered shape where the diameter of the hollow portion becomes gradually larger from the lens 19 toward the opening portion. Here, the CPU plays any or all rolls of above-described dot pattern analysis unit, trajectory recognition unit, process instruction unit, and information processing unit.

The guide light 18 is made of transparent or opaque white resin, and the interior portion functions as a path of a light. The irradiated light from the LED 20 travels through the interior portion of the guide light 18 and irradiates a medium 1 from the opening portion. If the guide light 18 is made of opaque white resin, the irradiated light from the LED 20 is diffused moderately when traveling inside the guide light 18, and the light from the opening unit can more evenly irradiate the medium 1.

Controlling LED Emission Timing

FIG. 13B is a diagram showing emission timing of the LED 20 in relation to time. The LED 20 exposes the medium 1 by emitting light instantaneously at a predetermined timing and strength. The C-MOS sensor 21 captures the reflected light off the medium 1 and transmits the image as image data to a dot pattern analysis unit.

FIG. 13C is a diagram showing a reaction state of the element of the C-MOS sensor 21 in relation to time. The element of the C-MOS sensor 21 is burned the afterimage of the medium 1 at the moment the medium 1 is exposed to light emitted with a predetermined strength by the LED 20. Here, predetermined time $t_k$ is a time duration required by a dot pattern analysis unit for retaining an analyzable afterimage within the time until the afterimage of the imaging element disappears.

If the time $_jt$ during which the LED 20 had been emitting is less than a predetermined time α, as shown in FIG. 13D, the element of the C-MOS sensor 21 is clearly burned the afterimage of dots and the afterimage is transmitted to the dot pattern analysis unit as image data. In this case, the transmission is performed during time $t_1$ during which the afterimage still remains on the element.

On the other hand, if time $_jt$ during which LED 20 had been emitting largely exceeds the predetermined time α, as shown in FIG. 13E, the element of the C-MOS sensor 21 is vaguely burned the afterimage of dots, and correct numerical value cannot be read.

While such an imaging method is particularly efficient in a case using a C-MOS sensor, it is no problem to use a CCD camera instead of the above-described imaging method.

Figure 14C:
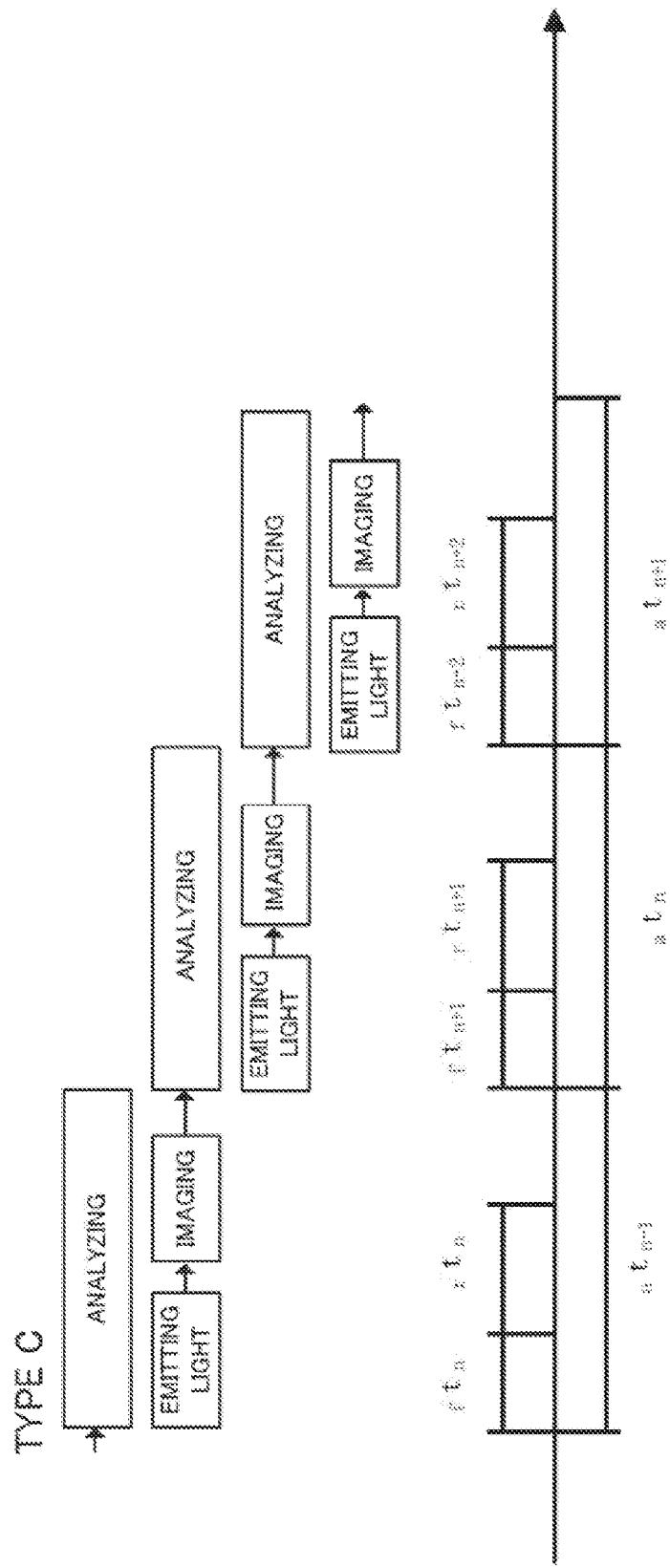

Referring to FIGS. 14A to 14C, the operations of a light control unit and a dot pattern analysis unit used in the invention are described.

FIG. 14A is a time line illustrating a first pattern of light emission timing of an LED 20 by a light control unit, timing for imaging a dot pattern by an imaging element and transmitting to a storage element, and timing for analyzing the image data by an dot pattern analysis unit. In the first pattern, light emission $_jt_n$, imaging $_rt_n$, and analysis $_at_n$ are sequentially performed, and when analysis $_at_n$ ends, the next light emission will not be performed until a predetermined time $t_s$ elapses. Here, the predetermined time $t_s$ defines the maximum values of time estimate values required for imaging, transmitting, and analyzing of a dot pattern, as estimate imaging, transmitting, and analyzing time.

FIG. 14B is a time line illustrating a second pattern of light emission timing of an LED 20 by a light control unit, timing for imaging and transmitting a dot pattern by an imaging element, and timing for analyzing the image data by a dot pattern analysis unit. In the second pattern, when analysis $_at_n$ ends, the light control unit detects the end of the analysis and immediately performs the next light emission $_jt_{n+1}$, then imaging $_rt_{n+1}$ and analyzing $_at_{n+1}$ of the next dot pattern are performed.

FIG. 14C is a time line illustrating a third pattern of light emission timing of an LED 20 by a light control unit, timing for imaging and transmitting a dot pattern by an imaging element, and timing for analyzing the image data by a dot pattern analysis unit. In the third pattern, a plurality of task processing or light control units and dot pattern analysis units are provided. Thus, analysis $_at_{n-1}$ and imaging $_rt_n$ of a dot pattern for the next analysis are performed simultaneously. When the analysis $_at_{n-1}$ ends, light emission $_jt_{n+1}$ is immediately performed, then, the image data already imaged in imaging $_rt_n$ is analyzed $_at_n$. It should be noted that, while the analysis $_at_n$ may further start simultaneously with light emission $_jt_{n+1}$, the light emission time of the LED 20 is extremely short and totaling of time from the light emission of the LED 20 until the analysis of the image data by the dot pattern analysis unit ends hardly make any difference.

Dot Pattern Analysis Unit

The dot pattern analysis unit code-analyzes image data according to an information input and output method, using a dot pattern of the above-described GRID1 to obtain XY coordinate information and code information defined by the dot pattern.

In the invention, since the dot pattern analysis unit sequentially code-analyzes the trajectory that a user has written (traced) on a medium using an imaging unit 9, the XY coordinate information and code information represents this trajectory (trajectory information).

Trajectory Recognition Unit

The trajectory recognition unit recognizes a character and a figure written on the medium based on a change in the trajectory information.

The trajectory recognition method is a method performed by considering a character and a figure as a graphic as in the case of a general OCR (Optical Character Reader) and referring to the XY coordinate pattern of the character and figure in a database.

Here, particularly in the present invention, a content to be written in a writing region can be specified in advance using code information. That is, trajectory information can be recognized with high accuracy by referring to a character and/or figure information pattern table that is categorized in advance. As a specific example, if only Arabic number is specified, in advance, to be written, the trajectory recognition unit refers to only an Arabic number table, which enhances a recognition rate. If an Arabic number cannot be recognized, all characters and figures in the database may be referred to as usual.

Further, after performing the above-described trajectory recognition, the trajectory can be converted into a semantic information code by referring to a semantic information code table (a dictionary) that is defined in advance and relates semantic information of a character and/or a figure or a word consisting of one or a plurality of characters written in the writing region to code information. That is, for example, if "Tokyoto Bunkyoku" in Japanese is written in, the trajectory recognition unit firstly recognizes the pattern of each letter of "To," "Kyo," "To," "Bun," "Kyo," and "Ku," further, refers to a semantic information table (a dictionary), and converts into a semantic information code defined in advance as corresponding to "Tokyoto" and a semantic information code defined in advance as corresponding to "Bunkyoku," whereby the information processing unit can recognize that the names of places "Tokyoto" and "Bunkyoku" are input.

Moreover, referring to the semantic information code table (a dictionary) also helps pattern-recognition of a character. For example, when a user writes a character "To" in kanji of "Tokyo" in poor handwriting and it becomes hard for the trajectory recognition unit to recognize whether a user wrote "To" in kanji or "Sha" in kanji, if the word "Tokyo" in kanji is defined in the semantic information code table and the word "Shakyo" in kanji is not defined therein (the word "Shakyo" normally does not exist), the trajectory recognition unit 9 recognizes that the user wrote the character "To."

Process Instruction Unit

The process instruction unit transmits a process instruction based on the information recognized by the trajectory recognition unit to the information processing unit together with the trajectory information.

The process instruction unit directly provides the information processing unit with the above-described instructions: the instruction for specifying a page based on a page code defined by a dot pattern printed on a medium surface; the instruction for specifying a writing region based on a specific code; and the various instructions based on an action code.

Also, while the details are described later, the process instruction unit instructs the execution of a variety of operations in an application for handwriting input and output to the information processing unit.

Information Processing Unit

The information processing unit executes a variety of processing in response to the process instruction given by the handwriting input and output system.

Server

The handwriting input and output system may access a server 7 that stores a variety of information, as necessary.

Server for Trajectory Recognition

The server 7 can, for example, store information for trajectory recognition. As employed by a general OCR (Optical Character Reader), a plurality of characters and figures are stored in relation with XY coordinate patterns.

Also, the characters and figures are stored in relation with category codes that categorize these characters and figures.

Further, the characters and figures are stored in relation with semantic information codes for outputting a word consisting of one or a plurality of characters or a figure or a combination thereof by referring to a semantic information code table (a dictionary).

In a handwriting input and output system 1, as a writing region can be specified using code information as well as XY coordinate information, writing regions can be easily managed, even if the volume (the number) of the writing regions is large. Particularly, the system is advantageous when storing written information in a shared global server that can be commonly used by any people.

Other Servers

It should be appreciated that the server 7 can store a variety of information such as a sound, a written document, an image, a motion picture, an application and other information, as well as information for trajectory recognition. For example, the server 7 can store an application for handwriting input and output. That is, if an information processing unit does not have an application for handwriting input and output, the information processing unit can search in the server and execute the application for handwriting input and output in the server, provided, however, the application for handwriting input and output in the server may be given a priority for execution.

It should be noted that, instead of the server 7, an application for handwriting input and output of other information processing unit can be executed.

It should be appreciated that, other than the above-described embodiments, the server 7 can be implemented in a variety of ways by being modified.

Writing Operation

Writing operation in a handwriting input and output system using the G remocon 2 of the invention is described below.

The writing operation is performed by writing a character or a figure desired to be input in a writing region on a medium surface using an imaging unit 9.

While the imaging unit 9 moves over the medium surface, the imaging unit 9 images a dot pattern superimposed and printed on the writing region at a predetermined time interval. The following procedure is as described above.

Each operation executed by the handwriting input and output system is described below.

Method for Recognizing Character and Figure

FIGS. 15A to 15E are conceptual views illustrating a first operation of handwriting input of a character of a main text.

If a character is written in a writing region using the imaging unit 9 as shown in FIG. 15A, the imaging unit 9 sequentially images the dot pattern on the trajectory and the dot pattern analysis unit obtains the trajectory information consisted of XY coordinate information and code information as shown in FIG. 15B.

It should be noted that, while the spacing of imaging locations of the dot pattern on the trajectory is wide in FIG. 15B for convenience of explanation, the actual spacing is smaller.

As shown in FIG. 15C, the information processing unit executes the first operation based on the result of the recognition performed based on the trajectory information, and outputs the result on a display 6.

As shown in FIG. 15D, the recognition method for recognizing a figure does not change from the method for recognizing a character, and the recognition result is displayed on the display 6 as shown in FIG. 15E.

However, XY coordinate information obtained by the dot pattern analysis unit may be input/output without recognition of the character or the figure. In such a case, the handwriting input and output system functions just as a pen tablet.

Voicemail System

FIGS. 16 to 22 illustrates a voicemail system using the G remocon 2 of the invention.

Figure 16:
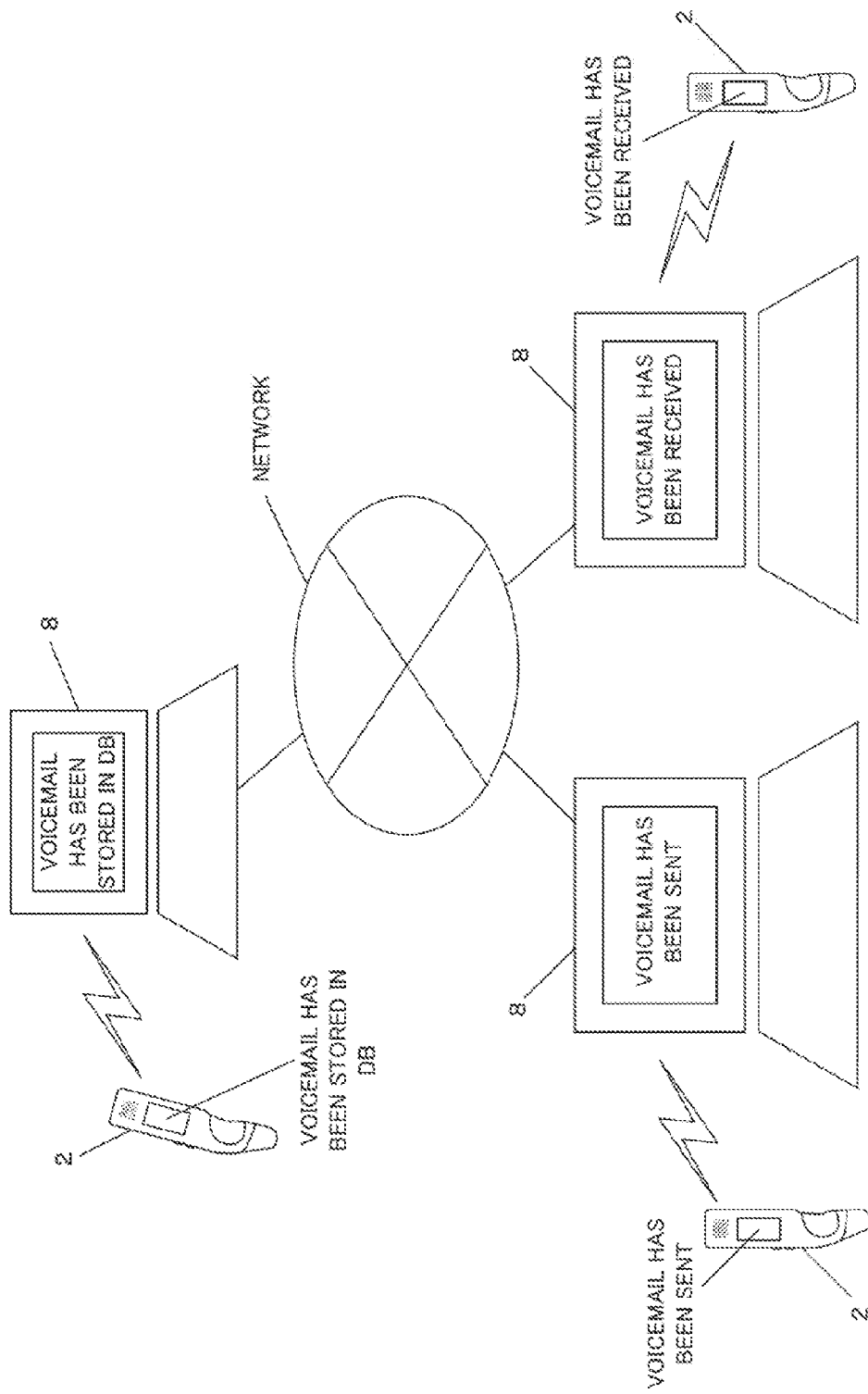
FIG. 16 is a diagram of a network configuration in a voice-mail system that is an embodiment of the invention.

FIG. 16 is a network configuration diagram of the embodiment. In the voicemail system of the invention, a personal computer 8 is connected to other personal computers 8 through a network such as the Internet, which allows transmitting and receiving of data there between. These personal computers 8 can communicate with a G remocon 2 by means of a near field communication system such as Bluetooth. It should be noted that the communication means between the G remocon 2 and a personal computer is not limited to such Bluetooth and may be any means including an infrared connection, a wireless LAN, and a wired connection using a USB cable.

Figure 17:
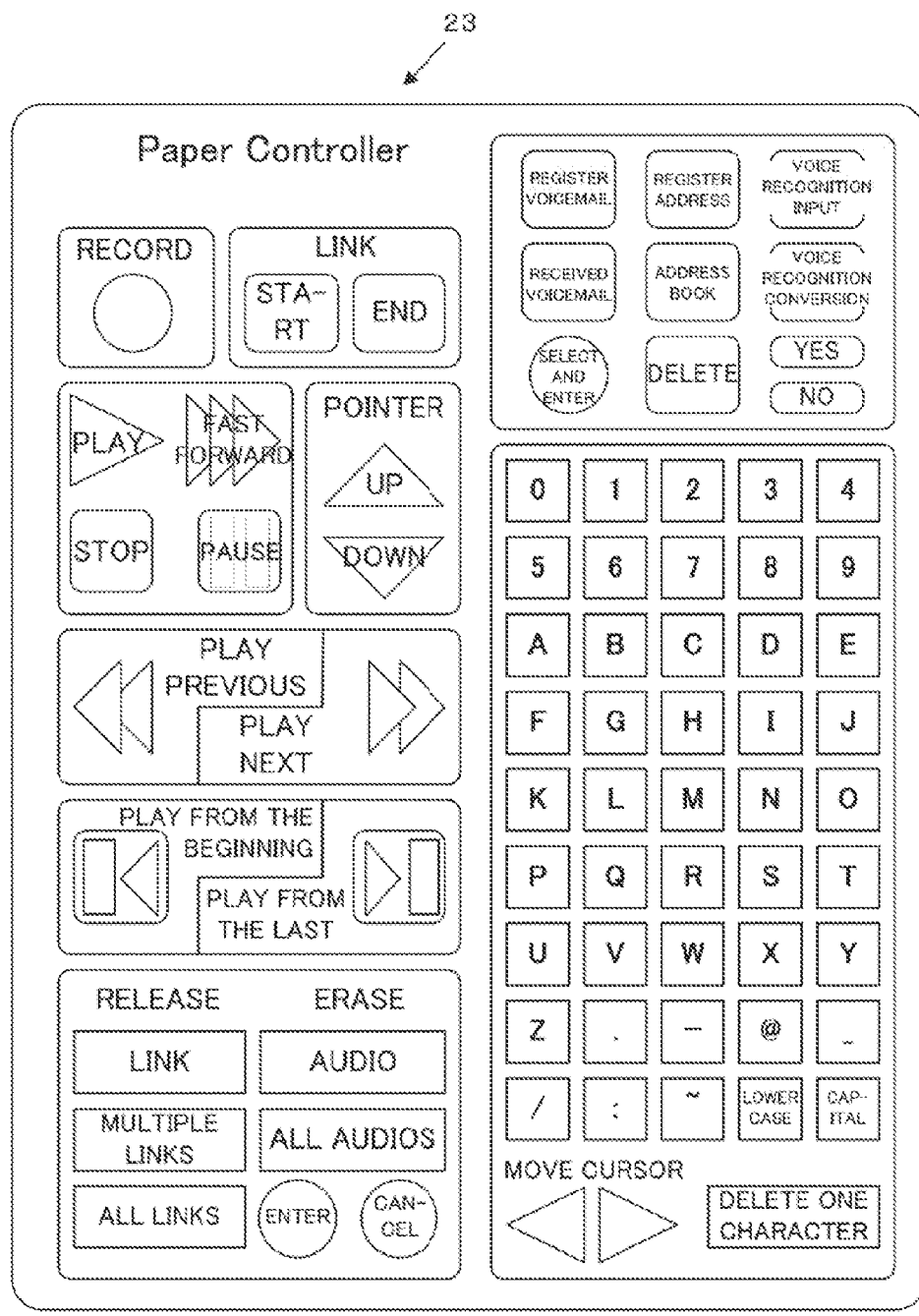
FIG. 17 is a diagram showing how the symbols are placed on a paper controller used in the voice-mail system.

FIG. 17 is a diagram illustrating a paper controller 23 used by a user for registering, transmitting, and receiving a voicemail.

The left part of the paper controller 23 is printed with symbols for recording, reproducing, and making a link to, a sound, while the right part is printed with symbols for transmitting and receiving a voicemail.

Figure 18:
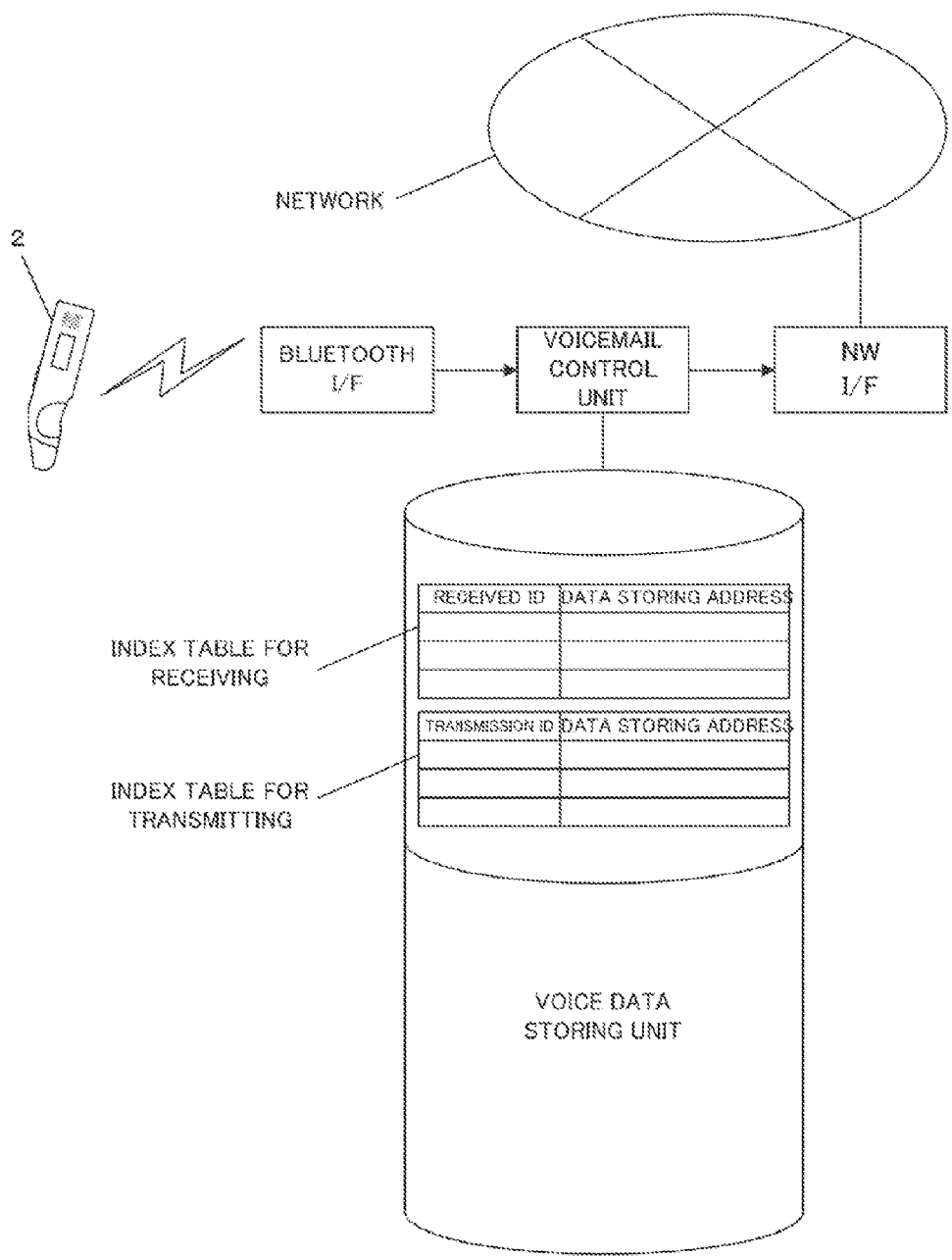
FIG. 18 is a diagram for illustrating a voice-mail database.

FIG. 18 is a diagram illustrating a voicemail database.

FIG. 18 is a system in which G remocons 2 transmit and receive each other voicemails, that is, audio data, input by the G remocons 2, while communicating with a voicemail control unit through Bluetooth Interface (I/F).

The voicemail control unit is consisted of a general-purpose server or a personal computer 8 that can connect to a network, and a voice data storing unit is provided on a hard disc device connected with the server or the personal computer 8.

The voice data storing unit comprises an index table for receiving and an index table for transmitting. Here, the index table for receiving registers a receiving ID (an originator address, or the ID number of the G remocon 2 of a receiving side) and a data storing address by relating them. Likewise, the index table for transmitting registers a transmission ID (an destination address, or the ID number of a destination G remocon 2) and a data storing address by relating them.

That is, the voicemail control unit registers a G remocon 2 ID to be managed by the voicemail control unit to an index table for receiving and registers a voicemail that is sent to the receiving ID defined for the G remocon 2 to an index table for receiving in the voice data storing unit of the voicemail control unit.

On the other hand, when a voicemail is input from a G remocon 2 managed by the voicemail control unit, the voicemail control unit once registers the transmission ID (i.e., a destination address, a destination G remocon 2 ID) in an index table for transmitting. After that, the voicemail control unit periodically accesses the index table for transmitting, and if there is an untransmitted voicemail, the voicemail control unit transmits the voicemail data to another voicemail control unit, not shown in FIG. 18, that manages the transmission ID of the voice mail data through the network interface (NW I/F) and the network.

Figure 19:
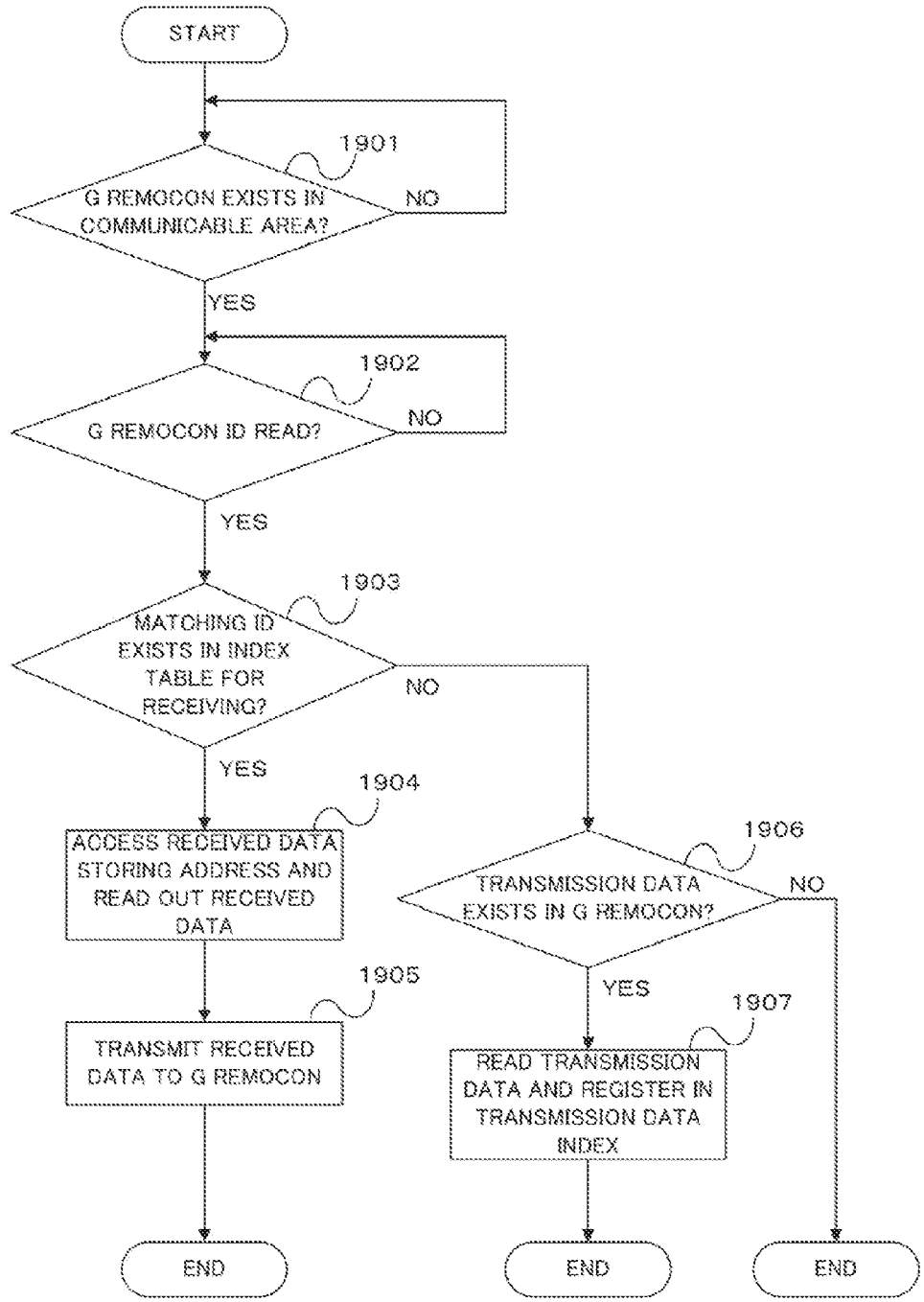
FIG. 19 is a flowchart showing a process of transmitting and receiving a voicemail.

FIG. 19 is a flowchart illustrating transmitting and receiving of data between a G remocon 2 and a personal computer 8 (a voicemail control unit).

First, whether there is a G remocon 2 in the communicable area is determined (1901). If a G remocon 2 is placed near the personal computer 8, a near field communication system, such as Bluetooth, transmits a G remocon ID to the personal computer 8. If this G remocon ID is transmitted, it is determined that there is the G remocon 2 in the communicable area.

Next, whether the G remocon ID is read or not is determined (1902). The personal computer 8 reads out the G remocon ID through a Bluetooth I/F.

Next, whether there is a matching ID in the index table for receiving is determined (1903). The control unit determines whether there is an ID matching the read G remocon ID in the index table for receiving within a voice data database. If it is determined that there is the receiving ID, the control unit accesses the data storing address corresponding to the receiving ID and reads out the received data (1904). Then, the control unit transfers the read received data to the G remocon 2 through the Bluetooth I/F (1905), and ends the process.

On the other hand, if there is no matching ID in the index table for receiving, whether there is transmission data in the G remocon 2 is determined (1906). If there is transmission data, the control unit reads out the transmission data, that is, the destination address and voice data, and registers to a transmission data index table in the database (1907). The control unit ends the process after completing the registration.

Figure 20:
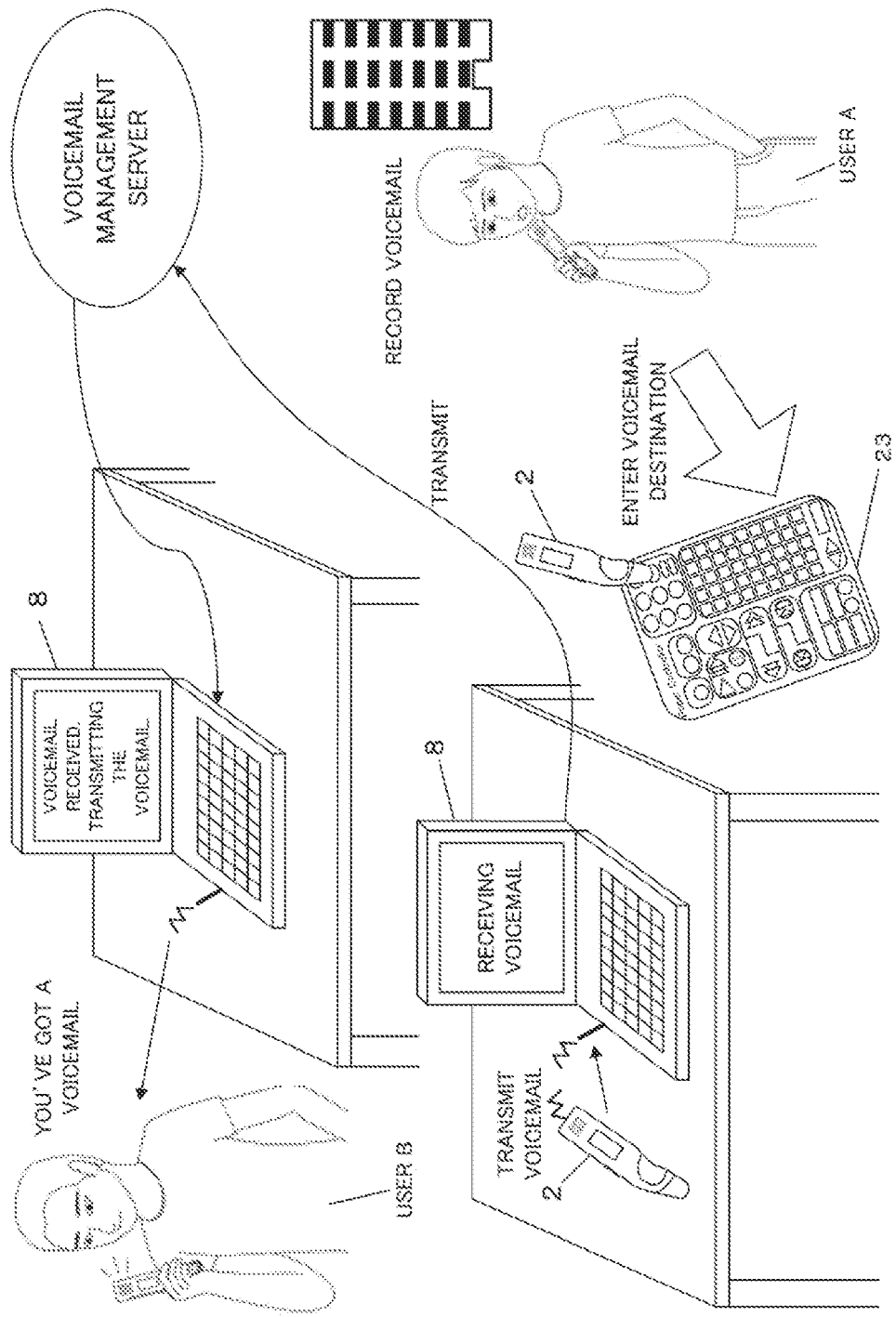
FIG. 20 is a diagram for illustrating transmitting and receiving of a voicemail.
Figure 21:
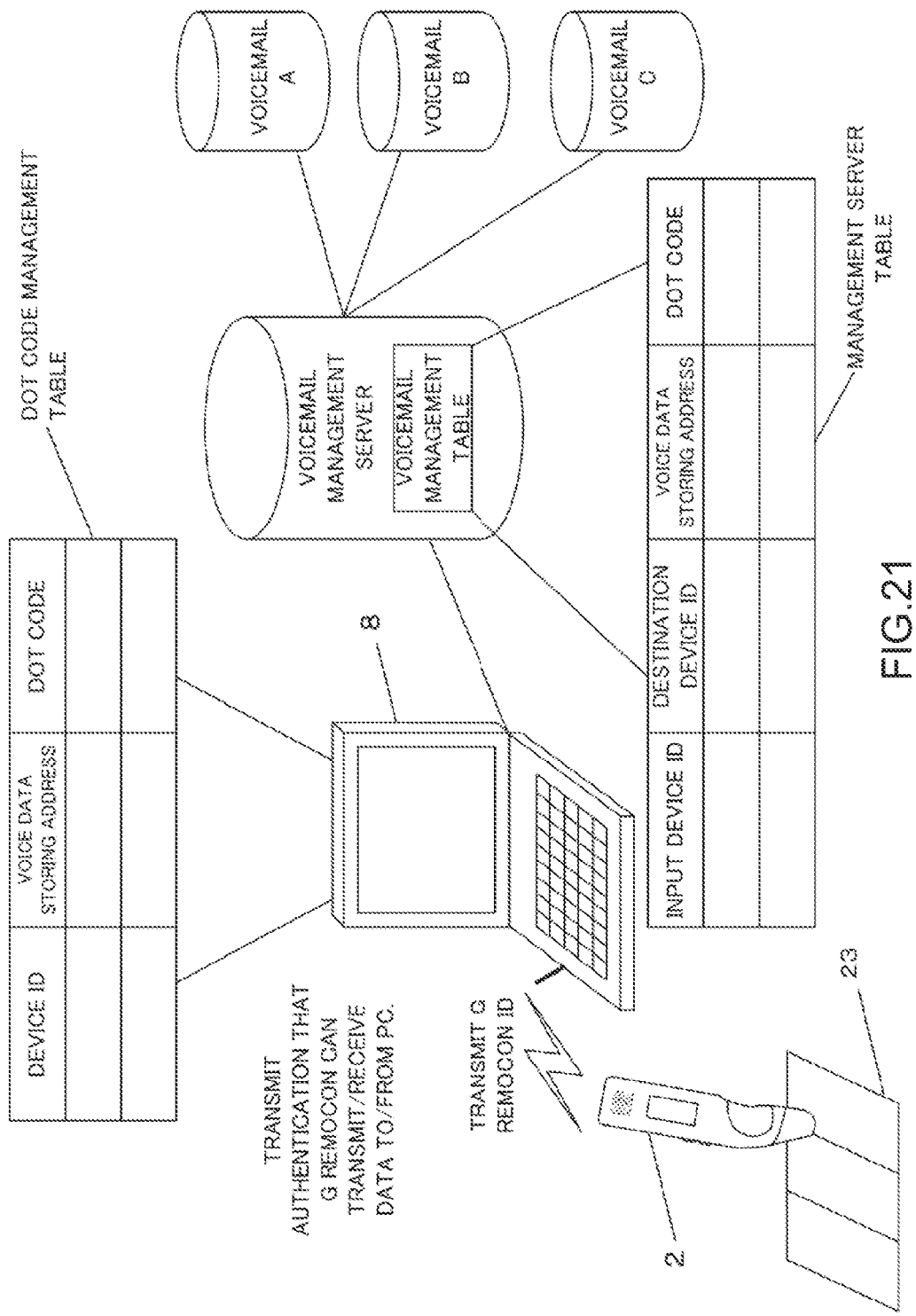
FIG. 21 is a diagram illustrating a voicemail manager that is an example of the voicemail system.
Figure 22:
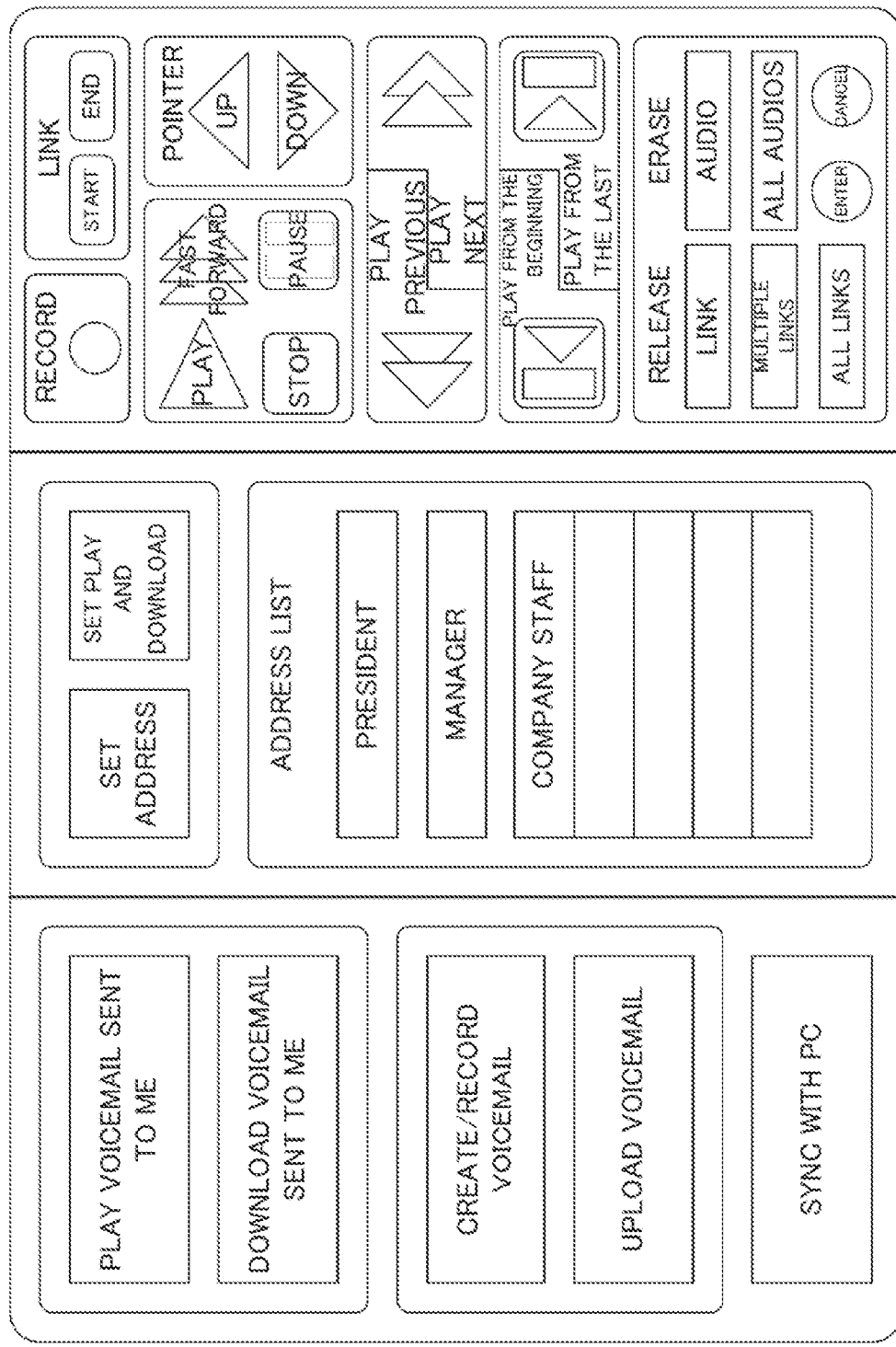
FIG. 22 is a diagram showing how symbols are placed on a paper controller used in the voice-mail manager.

FIG. 20 shows an illustrative example in which users transmit and receive voicemails each other. The system in FIG. 20 manages voicemails in an integrated manner as the voicemail management server is connected over a network as shown in FIG. 21.

When a user A makes a desired sound for inputting toward the microphone of a G remocon 2 out of doors. The voice data is accumulated as digital data in the memory of the G remocon 2 through the microphone thereof.

Next, user A determines where to transmit the voicemail. That is, the destination address is input using a paper controller 23. The input address is registered in the memory of the G remocon 2.

When user A enters indoors, such as a house and an office, and performs transmission processing of a voicemail, the user first places the voicemail near the personal computer 8. Then, the personal computer 8 reads out a device ID defined for each G remocon 2, that is, G remocon ID, using a Bluetooth communication function. Next, the voice data and the mail address accumulated in the memory are transmitted to the personal computer 8.

When the personal computer 8 (a voice mail control unit) receives the voice data and the mail address, "Receiving voicemail" is displayed on the monitor (a display device). Then, the personal computer 8 transmits the voice data and the mail address to the voice mail management server.

The voice mail management server registers the received voice data and address to a database in the server, then transmits the voice data to the corresponding destination address through a network interface. The personal computer 8, after receiving the voicemail, displays "Voicemail received. Transmitting the voicemail" on the monitor (a display device), then transmits the voice data to a G remocon 2 of user B through the Bluetooth interface. When the G remocon 2 receives the voice data, the G remocon 2 informs user B "You've got a voicemail" by a sound and/or on the monitor thereof. In this way, user B receives a message transmitted by user A.

FIG. 21 shows an example of a case where a G remocon 2 is used working with a voicemail management server using a control program (voicemail manager) installed in a personal computer 8 (PC).

A user causes a CD-ROM or a program that the user accessed a distribution server on the Internet and downloaded and installed to execute on a personal computer 8 (PC) and to register voicemail manager on the OS (Operating System) as a resident program.

Next, when the G remocon 2 is placed near the personal computer 8 (PC), the G remocon ID is transmitted to the personal computer 8 (PC) by a near field communication system such as Bluetooth. The central processing unit (CPU) in the personal computer 8 (PC) authenticates the G remocon ID in a voicemail management server. That is, the transmitted G remocon ID is authenticated whether the ID is of a G remocon 2 that can transmit and receive data using the personal computer 8 (PC).

Here, if the ID is of a transmittable and receivable G remocon 2, the CPU refers to the voicemail management table (a dot code management table) in the personal computer 8 (PC) and checks whether a voicemail transmitted to the G remocon ID is stored or not.

If the voicemail is stored, the central processing unit (CPU) reads out and transmits the voicemail to the G remocon by a near field communication system such as Bluetooth.

Next, as the G remocon 2 reproduces the voice data received (downloaded) from the personal computer 8, the recipient can listen to the voicemail.

If no voicemail is stored in the voicemail management table (a dot code management table), the CPU refers to a voicemail management server on the Internet. Here, if the voicemail transmitted to the G remocon ID is stored in the voicemail management table of the voicemail management server, the voicemail is read out and downloaded into the personal computer 8 (PC).

When a necessary voicemail is downloaded into each personal computer 8 (PC) that manages a G remocon 2, additional data for activating the voicemail (a voice data storing address, a dot code) to the voicemail management table is downloaded together with the voicemail, and, thereafter, the data is managed only in the voicemail management table in the personal computer 8.

Therefore, if the same G remocon ID is transmitted thereafter, the CPU does not access the voicemail management server again, and reads out a voicemail downloaded in the hard disc device (HD) of the personal computer 8 based on the voicemail management table including the newly added data.

It should be noted that when performing a transmission process using a G remocon 2, if the G remocon 2 managed by the personal computer 8 is placed nearby, the personal computer 8 communicates via Bluetooth with the G remocon 2, reads out G remocon ID (device ID), and reads out the accumulated voicemail from the memory of the G remocon 2. Here, the dot code of a dot pattern that is scanned when the G remocon 2 records a sound is associated with the device ID and registered.

Then, the personal computer 8 periodically accesses the voicemail management server by batch processing and transmits data of the voicemail management table to the voicemail management server. The voicemail management server, after receiving the data, updates its own voicemail management table based on the data.

Further, a user can reproduce and download a voicemail that is sent to the user and received by a personal computer 8 using a paper controller 23 as shown in FIG. 39.

Moreover, a user can create, register, and upload a voicemail to a personal computer 8.

Moreover, a region is also prepared that registers the dot pattern of a mode for synchronizing the content of the voicemail in the personal computer 8 with the content of the memory of a voice recorder.

Other Applicable Examples

Figure 24:
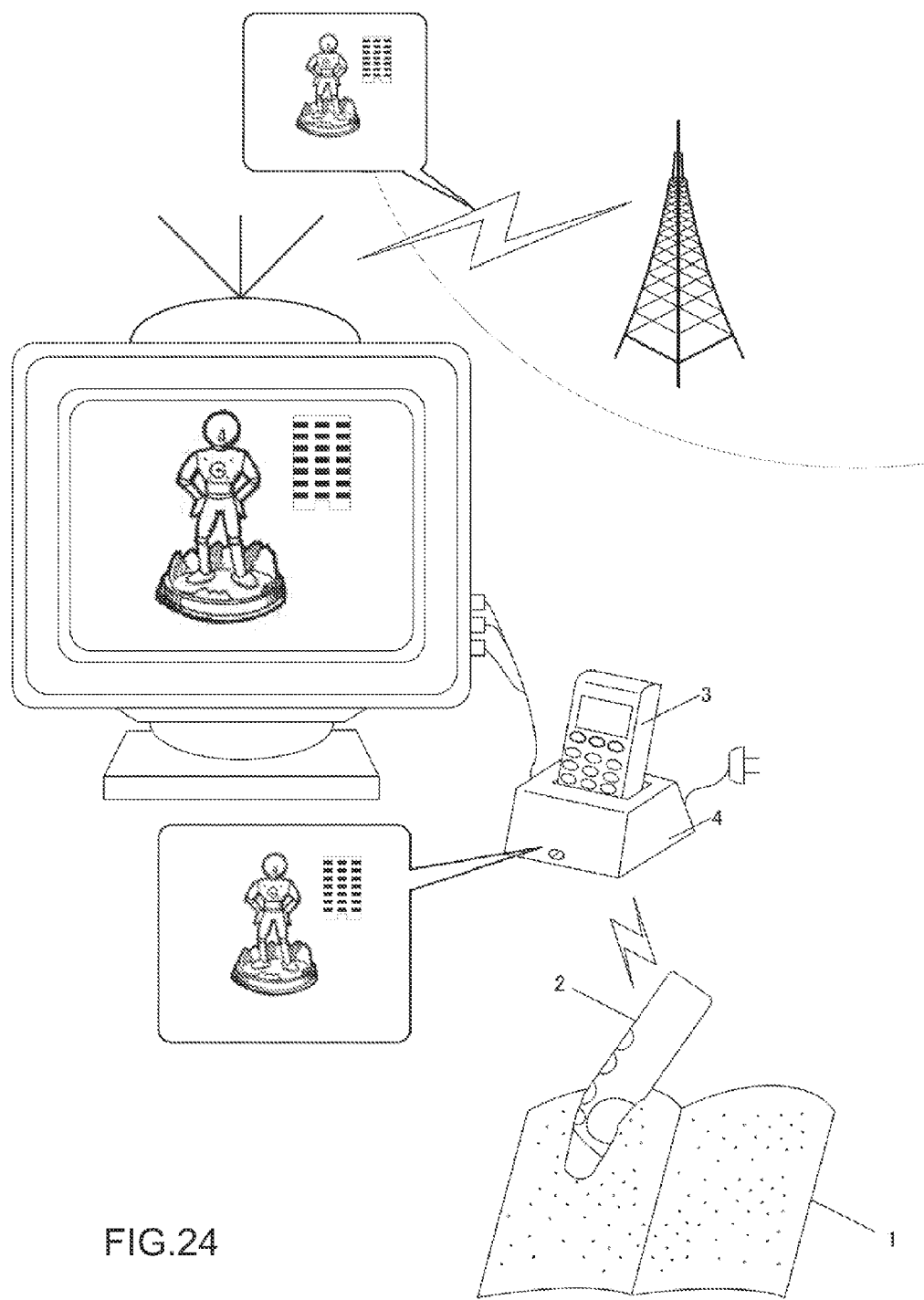
FIG. 24 is a diagram for illustrating storing of an image or sound information output from audio-visual equipment that is an embodiment of the invention.
Figure 25:
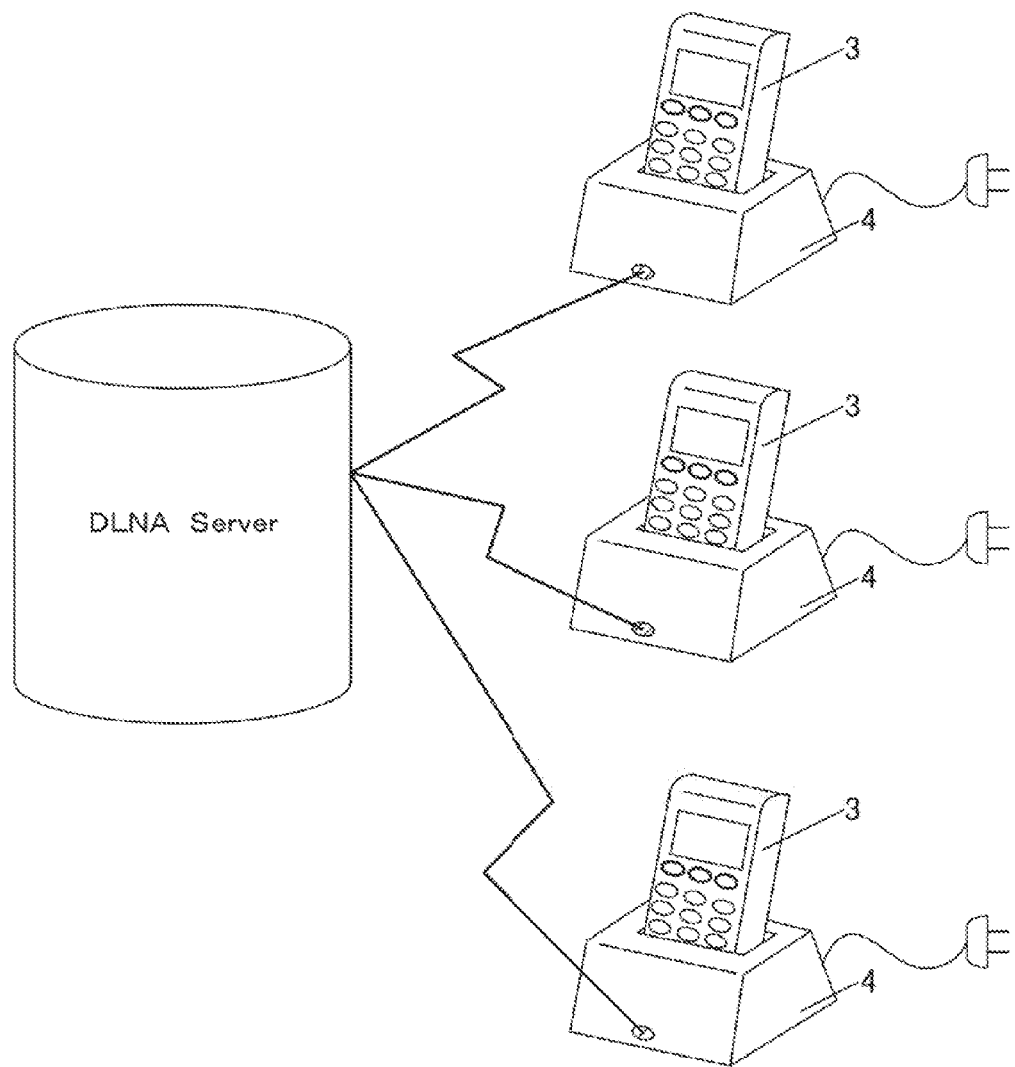
FIG. 25 is a diagram for illustrating how a plurality of mobile phone cradles share information stored in a DLNA server through LAN connection.

The mobile phone cradle 4 of the invention may not only use audio-visual equipment as output means of a mounted mobile phone, but also store image or sound information output from audio-visual equipment 5 as shown in FIG. 24, Moreover, in the invention, as shown in FIG. 25, a plurality of mobile phone cradles 4 may share information stored in DLNA server (Digital Network Alliance server) via a LAN connection and the shared information may be output from any cradle to audio-visual equipment.

Figure 26:
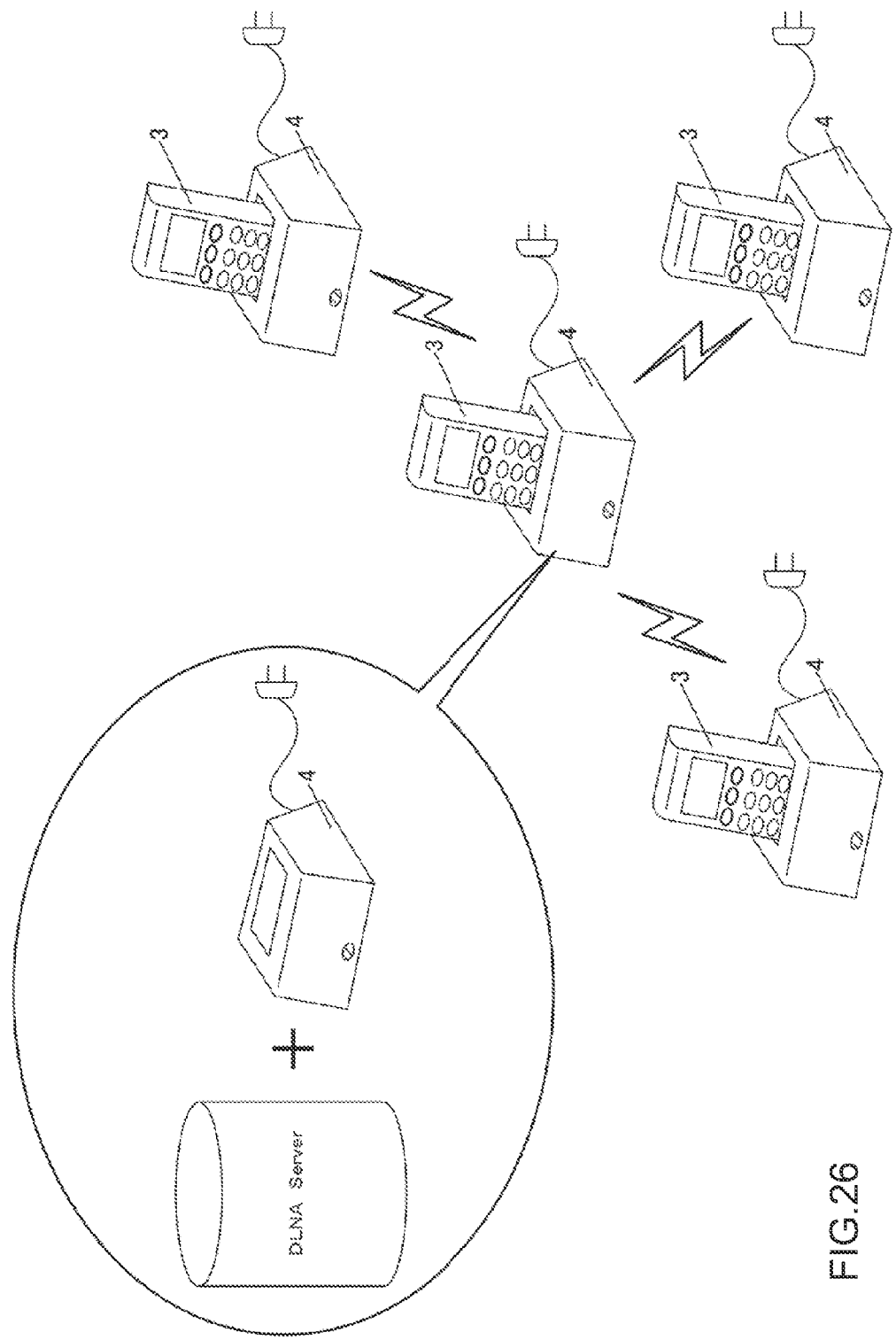
FIG. 26 is a diagram for illustrating an embodiment in which a mobile phone cradle also performs as a DLNA server.

The mobile phone cradle 4 of the invention may simultaneously work as DLNA server as shown in FIG. 26. In such a case, the mobile phone cradle 4 can store and reproduce the output image of audio-visual equipment 5 and the recording information and output information of a mobile phone 3.

Figure 27:
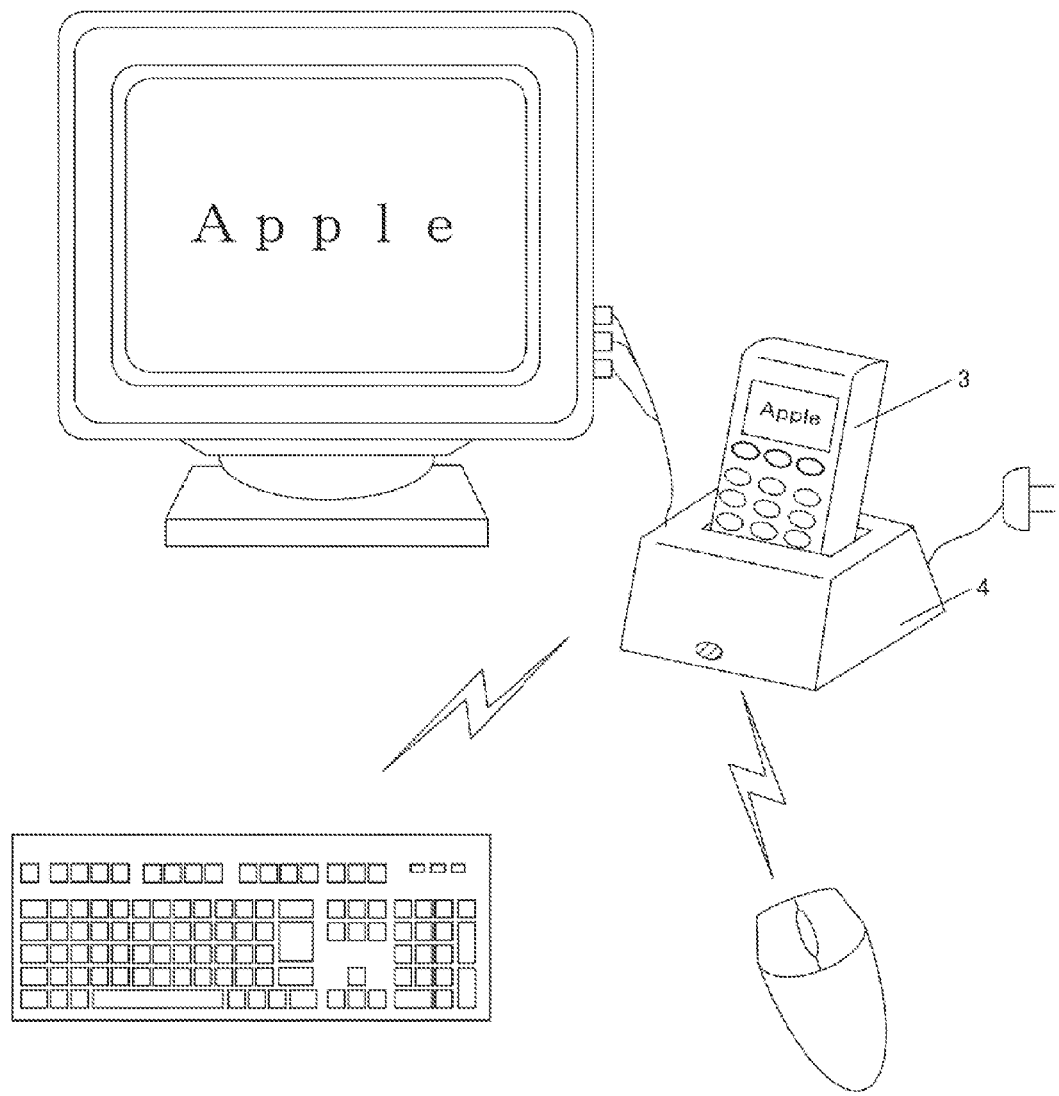
FIG. 27 is a diagram for illustrating an embodiment in which a mobile phone cradle communicates with an input device, such as a mouse and a keyboard, and inputs into a mobile phone 3.

As shown in FIG. 27, the mobile phone cradle 4 of the invention may input into a mobile phone 3 through a communication with an input device, such as a mouse and a keyboard.

Figure 28:
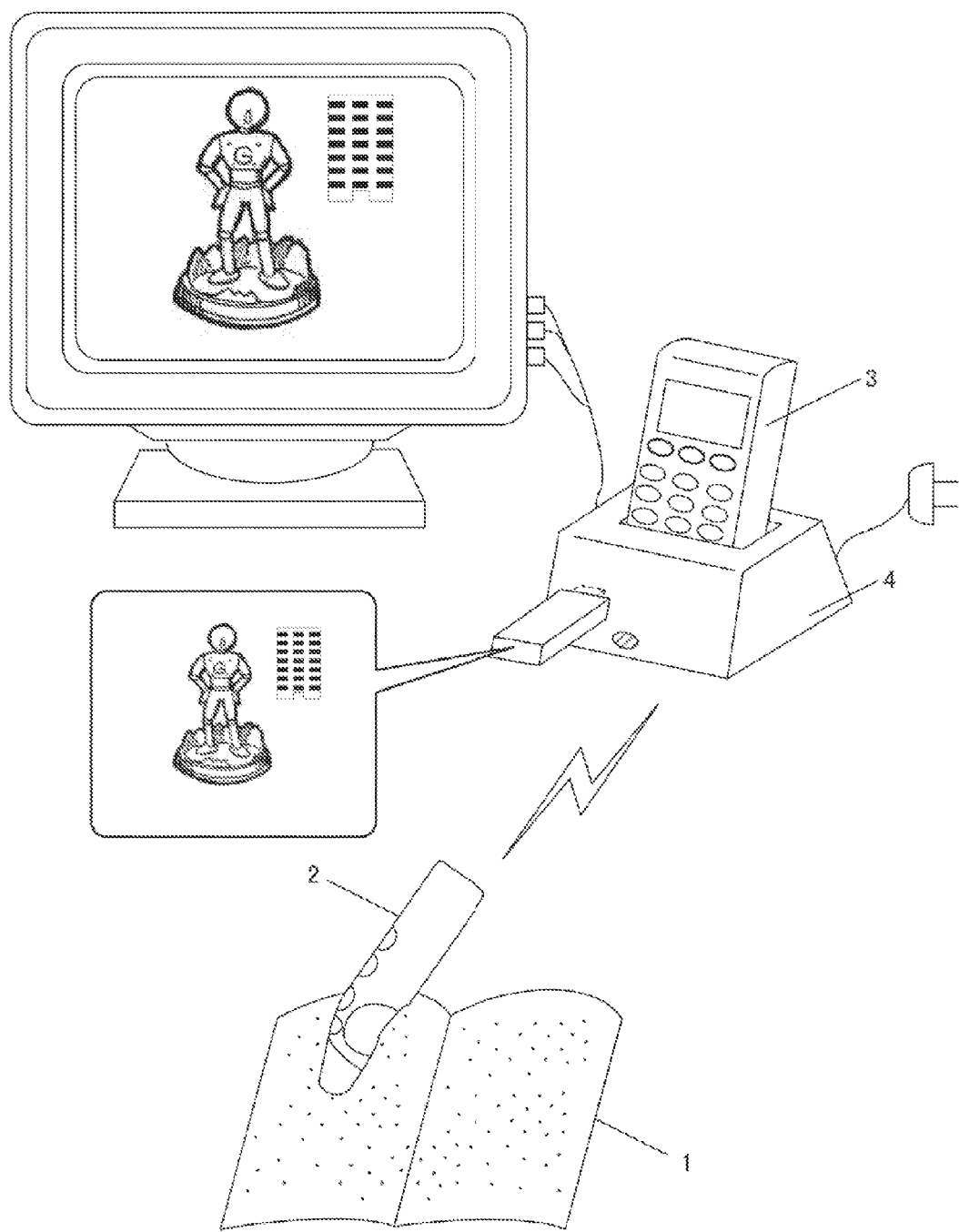
FIG. 28 is a diagram for illustrating a mobile phone cradle having a port for communicating with an external storage medium, such as an USB memory and an SD card, which is an embodiment of the invention.

As shown in FIG. 28, the mobile phone cradle 4 of the invention may have a port for communicating with an external storage medium, such as a USB memory and an SD card. In such a case, the mobile phone cradle can record the output image of audio-visual equipment 5 and the recording information and output information of a mobile phone 3 in the external storage medium and reproduce those data.

Figure 29:
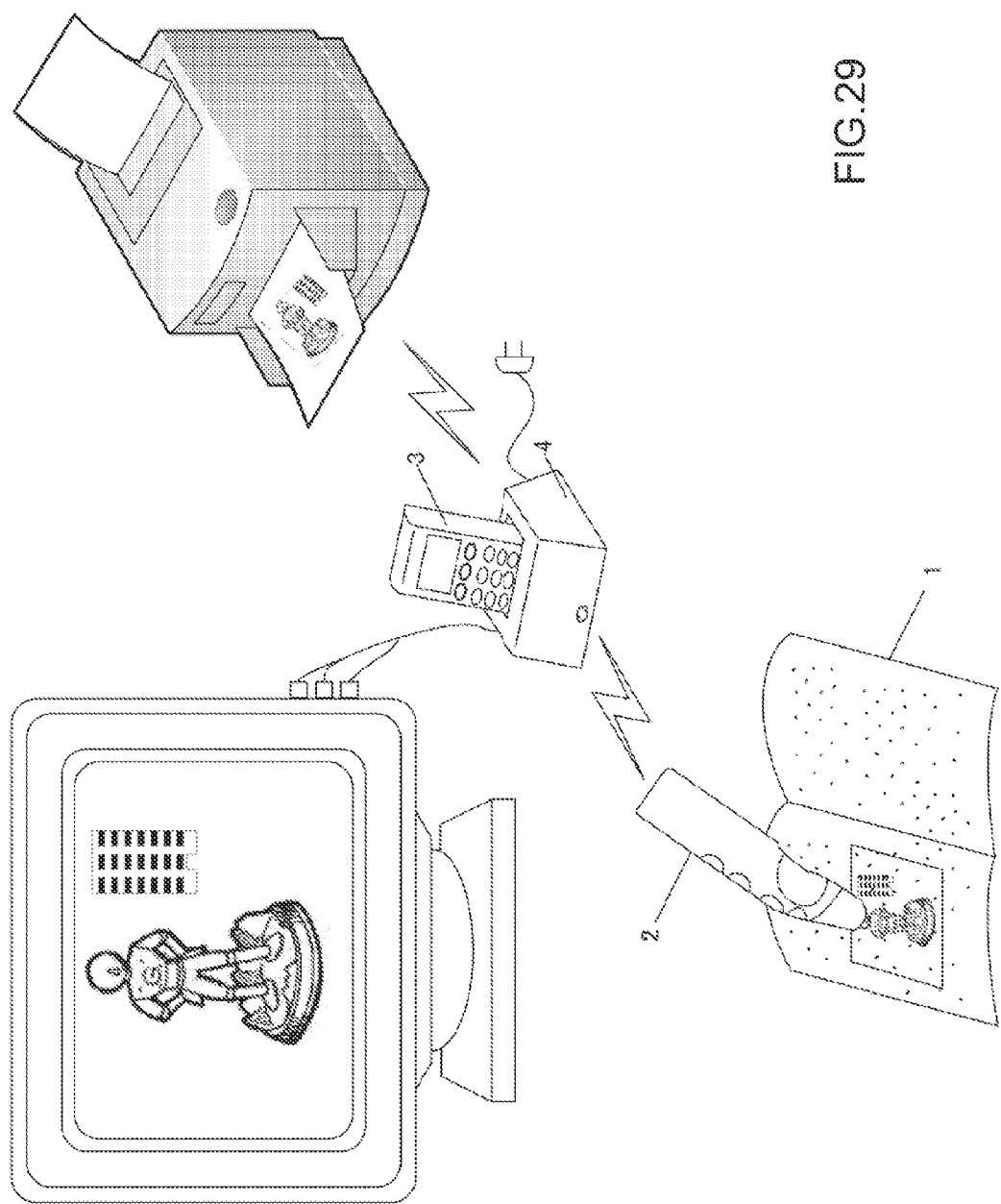
FIG. 29 is a diagram for illustrating an embodiment in which a mobile phone cradle is connected to a printer to print out an output image of audio-visual equipment, recording information and output information of the mobile phone, and recording information of the cradle.

As shown in FIG. 29, the mobile phone cradle 4 of the invention may connect with a printer to print out the output image of audio-visual equipment 5, the recording information and output information of a mobile phone, and the recording information of the cradle.

The mobile phone cradle 4 of the invention may have a microphone and a camera to use a videophone or a voicemail system.

There may be provided wired means for connection between a G remocon 2 and a cradle 4.

Audio-visual equipment 5 may be a settop box for cable television, a settop box for IP television, or an audio device.

All the processes performed by the mobile phone 3 in the invention may be processed on a server by communicating with the server, and, after the server has processed information transmitted from a G remocon 2 or a mobile phone cradle 4 to the mobile phone 3, the mobile phone 3 may receive the processed outcome from the server.

In such a configuration, the mobile phone 3 may receive only the outcome of the processing on the server and only output the outcome to audio-visual equipment 5 via the cradle.

However, the technical idea of the invention does not change whether the mobile phone 3 performs information processing or the server performs information processing, and both cases fall within the technical scope of the invention.

Figure 30:
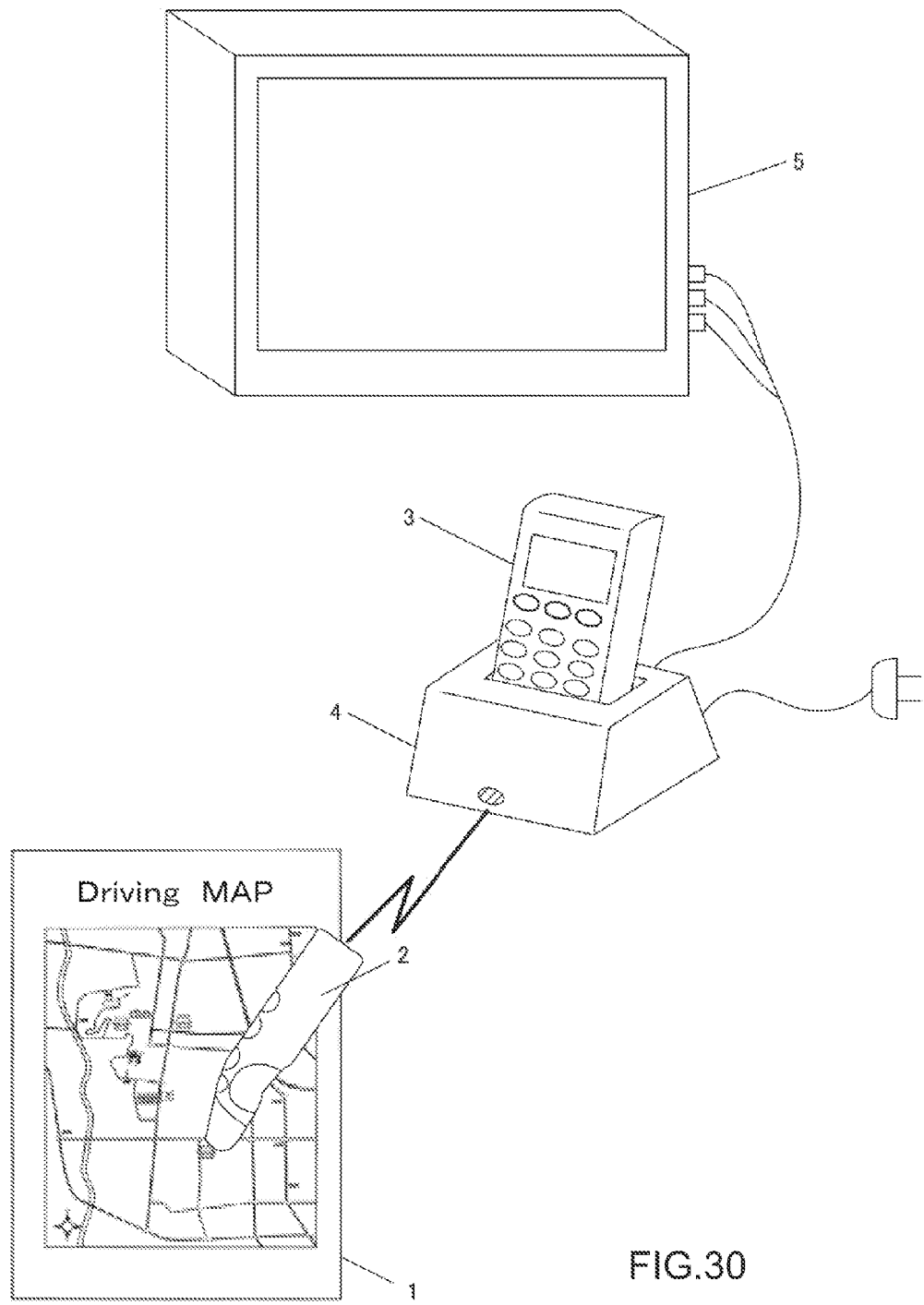
FIG. 30 is a diagram for illustrating a car navigation system that is an embodiment of the invention.

If the invention is used in a car navigation system, as shown in FIG. 30, a G remocon 2 may read out a dot pattern superimposed and printed on a map (a medium 1) and convert the destination information defined by the dot pattern, such as a longitude and a latitude, into the input format of the car navigation system, and a mobile phone 3 may transmit the information via cradle 4 to register to the car navigation system.

It should be noted that when reading out a dot pattern from a map, there are cases in which the touched region has no feature and the touched region has a feature.

In principle, if the touched region has no feature, the destination information is registered based on the longitude and latitude and XY coordinate values defined by the dot pattern, while if the touched region has a feature, the destination information is generally registered based on the longitude and latitude associated with the feature information.

However, even when the touched region has a feature, the destination information may be registered based on the longitude and latitude of the touched region instead of using the longitude and latitude associated with the feature information.

SUMMARY OF THE INVENTION (1) To solve the above problems, the mobile phone cradle of the invention is used with a scanner remote controller that reads a dot pattern, on a medium, in which a code and/or an XY coordinate value associated with information or an operation instruction are recorded, and transmits the information. The cradle for mobile phone comprises: being capable of having a mobile phone placed thereon and holding the mobile phone and communicating with the placed mobile phone; receiving data from the scanner remote controller to cause the scanner remote controller to function as input means for the mobile phone; and communicating with audio-visual equipment and controlling the audio-visual equipment to cause the audio-visual equipment to function as output means for the mobile phone.

(2) Further, to solve the above problems, in the mobile phone cradle of the invention, the mobile phone cradle may have a function for charging a battery of the mobile phone placed thereon.

(3) Further, to solve the above problems, in the mobile phone cradle of the invention, a communication between the scanner remote controller and the mobile phone cradle may be carried out by an infrared ray, Bluetooth, a faint radio wave, or other wired means, other wireless means.

(4) Further, to solve the above problems, in the mobile phone cradle of the invention, a communication between the mobile phone cradle and the audio-visual equipment may be carried out by IEEE1394 standard, an infrared ray, Bluetooth, a faint radio wave, other wired means, or other wireless means.

(5) Further, to solve the above problems, in the mobile phone cradle of the invention, the audio-visual equipment may be a television receiver.

(6) Further, to solve the above problems, in the mobile phone cradle of the invention, the mobile phone cradle may instruct controls of power ON/OFF, input switch, television program selection and the like, to the television receiver.

(7) Further, to solve the above problems, in the mobile phone cradle of the invention, the scanner remote controller may comprise audio input means; sound information input from the audio input means may be transmitted to the mobile phone through the mobile phone cradle; the mobile phone may execute a karaoke function; and an image and a word output by the execution of the karaoke function may be output together with the sound information to the audio-visual equipment.

(8) Further, to solve the above problems, in the mobile phone cradle of the invention, the scanner remote controller may comprise audio input means and voice recognition processing means, and sound information input from the audio input means may be converted into information, such as input data and/or an operation and control instruction by the voice recognition processing means, transmitted to the mobile phone directly or through the mobile phone cradle, and processed by the mobile phone.

(9) Further, to solve the above problems, in the mobile phone cradle of the invention, the scanner remote controller may comprise audio input means; the mobile phone cradle may comprise voice recognition processing means; and sound information input from the audio input means may be transmitted to the mobile phone cradle, converted into information, such as input data and/or an operation and control instruction, by the voice recognition processing means, transmitted to the mobile phone, and processed by the mobile phone.

(10) Further, to solve the above problems, in the mobile phone cradle of the invention, the scanner remote controller may comprise audio input means; the mobile phone may comprise voice recognition processing means; and sound information input from the audio input means may be transmitted to the mobile phone directly or through the mobile phone cradle, and, in the mobile phone, converted into information, such as input data and/or an operation and control instruction, by the voice recognition processing means and processed.

(11) To solve the above problems, the videophone system of the invention uses the mobile phone cradle.

(12) To solve the above problems, the karaoke system of the invention uses the mobile phone cradle.

(13) To solve the above problems, the car navigation system of the invention uses the mobile phone cradle.

(14) To solve the above problems, the mobile phone cradle of the invention may comprise: being capable of having a mobile phone placed thereon and holding the mobile phone and communicating with the placed mobile phone; communicating with audio-visual equipment and controlling the audio-visual equipment to cause the audio-visual equipment to function as output means for the mobile phone; and, based on a signal of disaster information and/or an alarm and the like received by the mobile phone, the mobile phone cradle controls the audio-visual equipment in turning power ON, turning power OFF, selecting a channel and the like.

(15) To solve the above problems, the emergency information notification system of the invention uses the mobile phone cradle.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. A mobile phone cradle used with a scanner remote controller that reads a dot pattern, on a medium, in which a code and/or an XY coordinate value associated with information or an operation instruction are recorded, and transmits the information, the cradle for mobile phone comprising:
   being capable of having a mobile phone placed thereon and holding the mobile phone and communicating with the placed mobile phone;
   receiving data from the scanner remote controller to cause the scanner remote controller to function as input means for the mobile phone; and
   communicating with audio-visual equipment and controlling the audio-visual equipment to cause the audio-visual equipment to function as output means for the mobile phone.

2. The mobile phone cradle according to claim 1, wherein the mobile phone cradle has a function for charging a battery of the mobile phone placed thereon.

3. The mobile phone cradle according to claim 1, wherein a communication between the scanner remote controller and the mobile phone cradle is carried out by an infrared ray, Bluetooth, a faint radio wave, or other wired means, or other wireless means.

4. The mobile phone cradle according to claim 1, wherein a communication between the mobile phone cradle and the audio-visual equipment is carried out by IEEE1394 standard, an infrared ray, Bluetooth, a faint radio wave, other wired means, or other wireless means.

5. The mobile phone cradle according to claim 1, wherein the audio-visual equipment is a television receiver, a cable television or an Internet protocol television set-top box.

6. The mobile phone cradle according to claim 1, wherein the audio-visual equipment is audio equipment.

7. The mobile phone cradle according to claim 5, wherein the mobile phone cradle instructs controls of power ON/OFF, input switch, television program selection, and the like to the television receiver.

8. The mobile phone cradle according to claim 1, wherein the scanner remote controller comprises audio input means;
   sound information input from the audio input means is transmitted to the mobile phone through the mobile phone cradle;
   the mobile phone executes a karaoke function; and
   an image and a word output by the execution of the karaoke function are output together with the sound information to the audio-visual equipment.

9. The mobile phone cradle according to claim 1, wherein the scanner remote controller comprises audio input means and voice recognition processing means, and
   sound information input from the audio input means is converted into information, such as input data and/or an operation and control instruction by the voice recognition processing means, transmitted to the mobile phone directly or through the mobile phone cradle, and processed by the mobile phone.

10. The mobile phone cradle according to claim 1, wherein the scanner remote controller comprises audio input means;

the mobile phone cradle comprises voice recognition processing means; and sound information input from the audio input means is transmitted to the mobile phone cradle, converted into information, such as input data and/or an operation and control instruction, by the voice recognition processing means, transmitted to the mobile phone, and processed by the mobile phone.

11. The mobile phone cradle according to claim 1, wherein the scanner remote controller comprises audio input means;

the mobile phone comprises voice recognition processing means; and sound information input from the audio input means is transmitted to the mobile phone directly or through the mobile phone cradle, and, in the mobile phone, converted into information, such as input data and/or an operation and control instruction, by the voice recognition processing means and processed.

12. The mobile phone cradle according to claim 8, wherein a voicemail system is implemented in the mobile phone using the audio input means.

13. A videophone system using the mobile phone cradle according to claim 1.

14. A karaoke system using the mobile phone cradle according to claim 8.

15. A car navigation system using the mobile phone cradle according to claim 1, wherein the medium is printed with a map, a photograph, a graphic, and a text;

the medium is further superimposed and printed with a dot pattern in which destination information indicated by the map, photograph, graphic, and text, and a code and/or an XY coordinate value associated with the destination information are recorded;

the scanner remote controller reads out the dot pattern and transmits the dot pattern to the mobile phone cradle; and the mobile phone receives the dot pattern from the mobile phone cradle, converts the dot pattern into the destination information, and transmits the destination information to the car navigation system.

16. The mobile phone cradle according to claim 1, wherein, based on a signal of disaster information and/or an alarm and the like received by the mobile phone, the mobile phone cradle controls the audio-visual equipment in turning power ON, turning power OFF, selecting a channel, outputting disaster information received by the mobile phone, outputting an associated sound or image stored in advance, or the like.

17. An emergency information notification system using the mobile phone cradle according to claim 15.

18. The mobile phone cradle according to claim 1, wherein the mobile phone directly receives data from the scanner remote controller.

19. The mobile phone cradle according to claim 1, wherein the scanner remote controller draws a text on a medium and simultaneously reads out XY coordinate values representing a trajectory of the text;

any one selected from the group consisting of the scanner remote controller, the mobile phone cradle, the mobile phone, and a server for character recognition, performs character recognition and instructs a mobile phone based on a result of the character recognition.

20. The mobile phone cradle according to claim 1, wherein a plurality of the cradles for mobile phones are connected by a home LAN and share information stored in a DLNA server, and any one of the cradles can output to the audio-visual equipment.

21. The mobile phone cradle according to claim 20, wherein at least one of the cradles for mobile phones simultaneously works as the DLNA server, and records and reproduces an output image of the audio-visual equipment, or recording information and output information of a mobile phone, that are output through the cradle.

22. The mobile phone cradle according to claim 1, wherein the mobile phone cradle communicates with a printer to allow printing of an output image of the audio-visual equipment, or recording information and output information of a mobile phone, that are output through the cradle, and recording information of the cradle.

23. The mobile phone cradle according to claim 1, wherein the mobile phone cradle communicates with an input device, such as a mouse and a keyboard, to allow input by the input device to the mobile phone.

24. The mobile phone cradle according to claim 1, wherein the mobile phone cradle communicates with an external storage medium and records and reproduces an output image of the audio-visual equipment, or recording information and output information of a mobile phone, that are output through the cradle.

25. The mobile phone cradle according to claim 9, wherein a voicemail system is implemented in the mobile phone using the audio input means.

26. The mobile phone cradle according to claim 10, wherein a voicemail system is implemented in the mobile phone using the audio input means.

27. The mobile phone cradle according to claim 11, wherein a voicemail system is implemented in the mobile phone using the audio input means.

* * * * *